United States Patent [19]

Schlosser et al.

[11] 3,879,580

[45] Apr. 22, 1975

[54] DATA TERMINAL FOR USE WITH TDMA PROCESSING REPEATER

[75] Inventors: Leslie H. Schlosser, Los Angeles; Frank J. Moreno, Torrance, both of Calif.

[73] Assignee: Hughes Aircraft Company, Culver City, Calif.

[22] Filed: Nov. 24, 1972

[21] Appl. No.: 309,325

[52] U.S. Cl. .................................. 179/15 BS; 325/4

[51] Int. Cl. .................................. H04j 3/06

[58] Field of Search ........ 325/4; 179/15 BV, 15 BA, 179/15 BS, 15 BW

[56] References Cited

UNITED STATES PATENTS 3,534,264 10/1970 Blasbalg ........................ 179/15 BV

*Primary Examiner*—Ralph D. Blakeslee

*Attorney, Agent, or Firm*—John M. May; W. H. MacAllister

[57] ABSTRACT

The present invention relates to data terminals for use in a TDMA communication system which provides the individual data terminals with synchronization error measurements and other commands. Each individual data terminal is capable of transmitting a narrowband coarse synchronization signal in response to a system command, thereby permitting rapid initial synchronization to be achieved. The disclosed data terminals transmit data in burst fashion at one uplink bandwidth, and receive downlink data at a second, narrower bandwidth.

2 Claims, 43 Drawing Figures

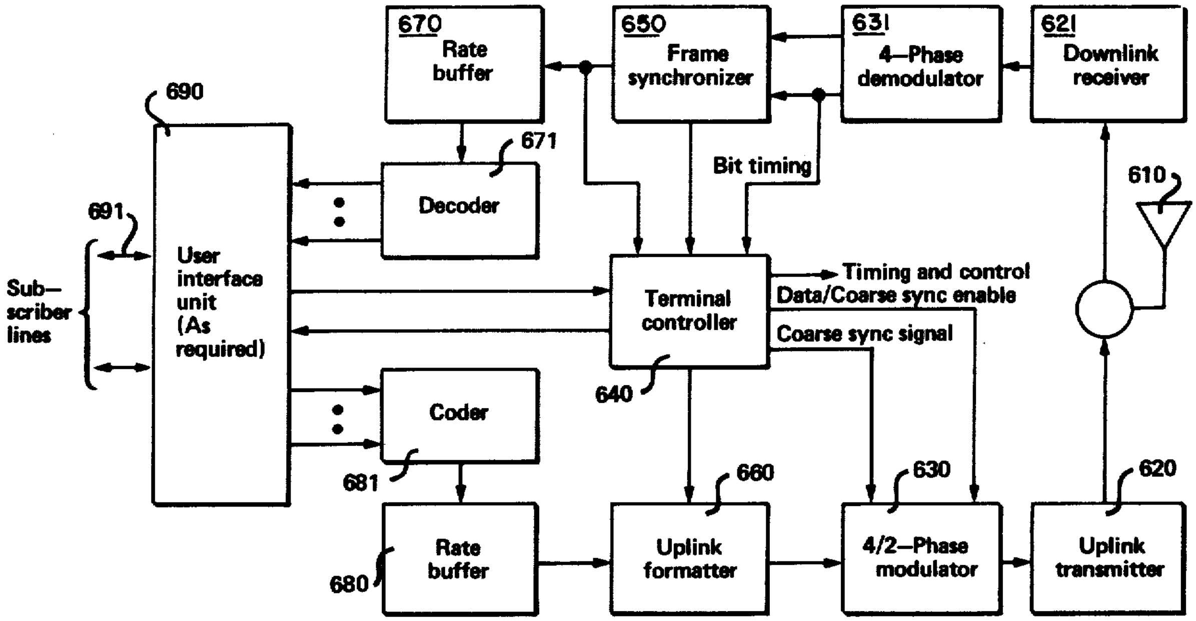
FIG. 6. GENERAL DATA TERMINAL CONFIGURATION
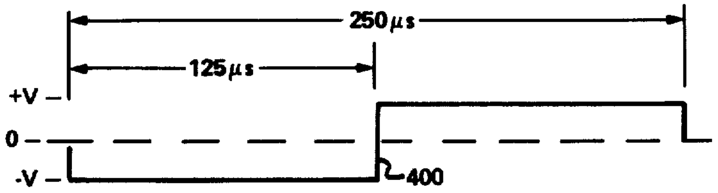
FIG. 4. COARSE SYNC SIGNAL
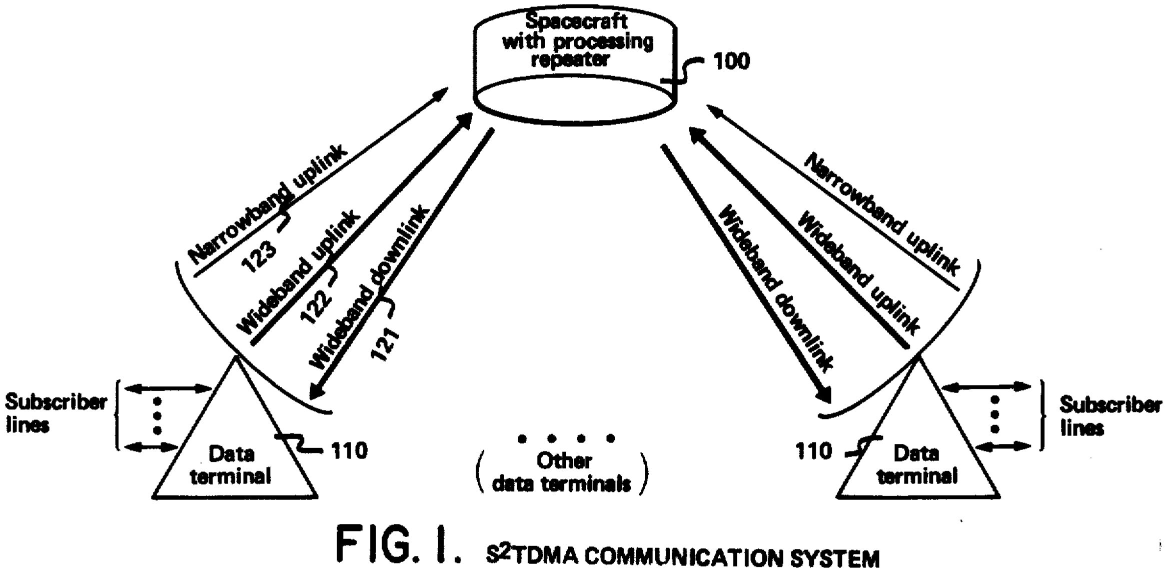
FIG. 1. S2TDMA COMMUNICATION SYSTEM

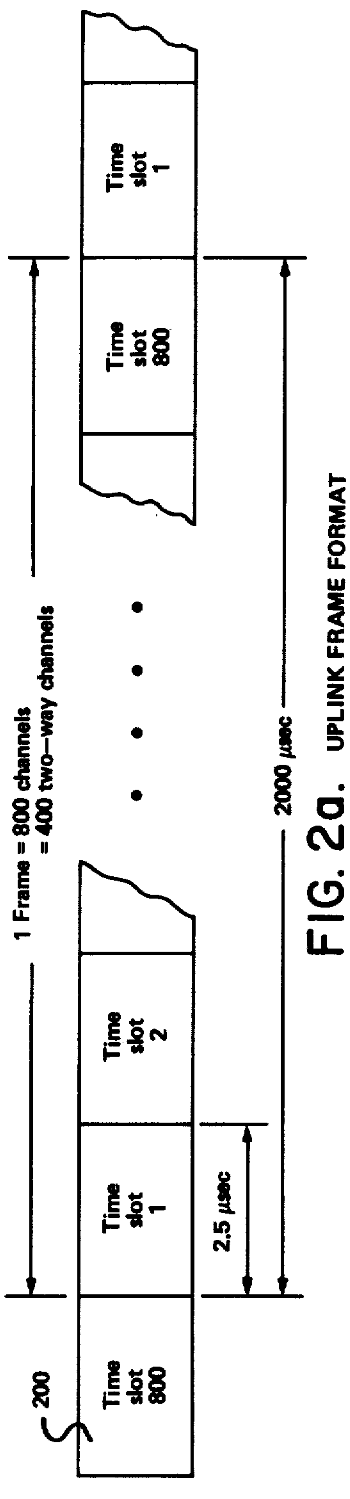
FIG. 2a. UPLINK FRAME FORMAT
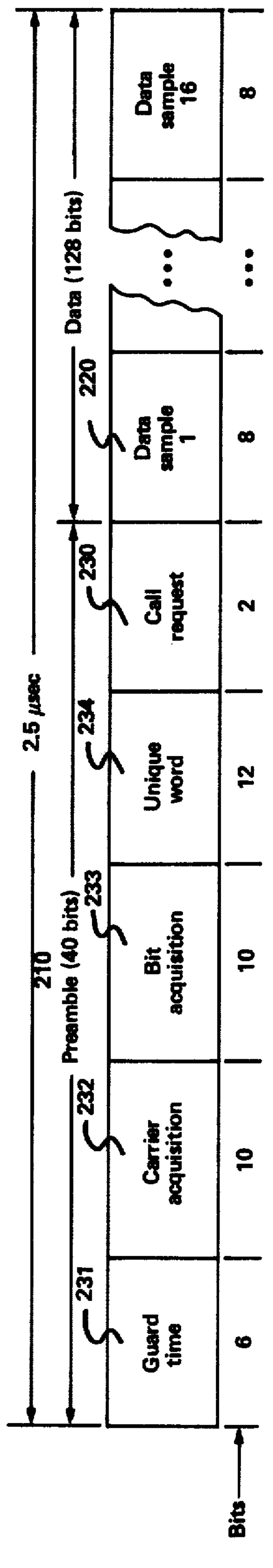
FIG. 2b. DATA BURST FORMAT
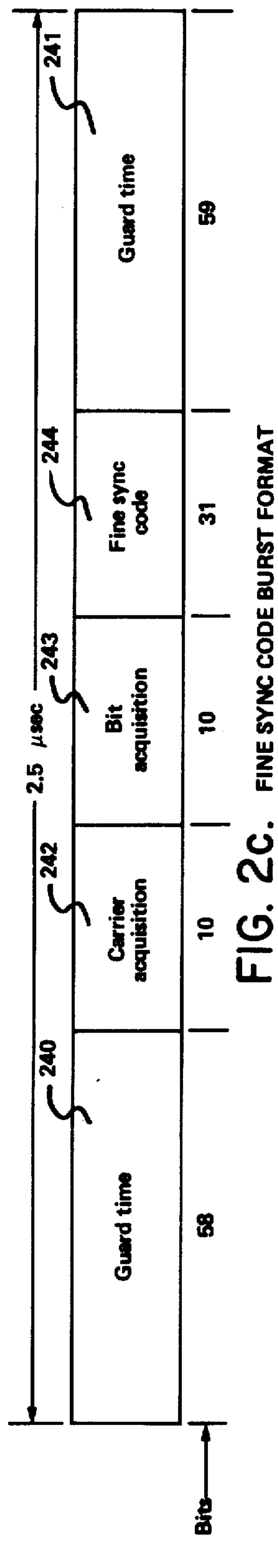
FIG. 2c. FINE SYNC CODE BURST FORMAT

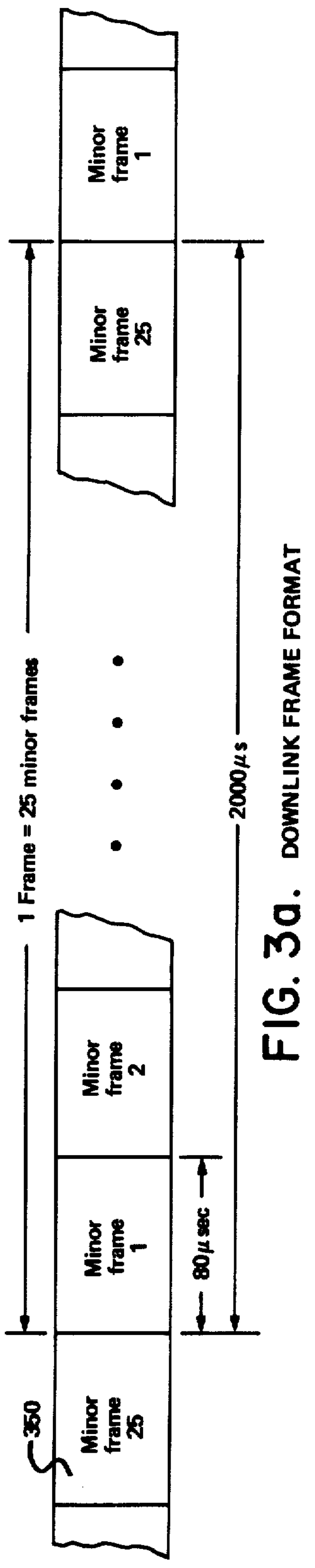
FIG. 3a. DOWNLINK FRAME FORMAT
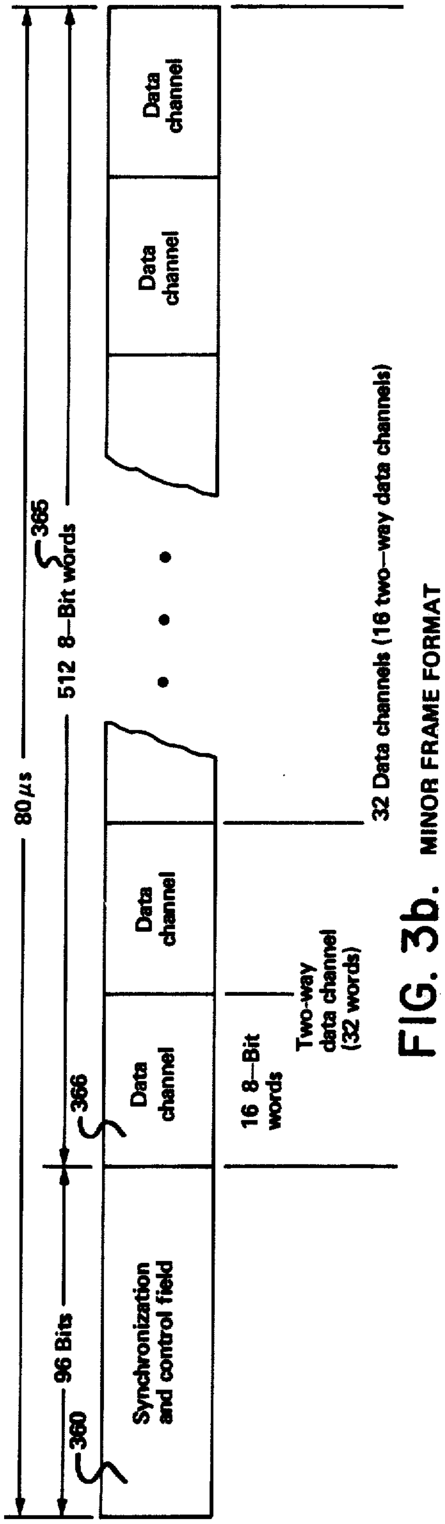
FIG. 3b. MINOR FRAME FORMAT
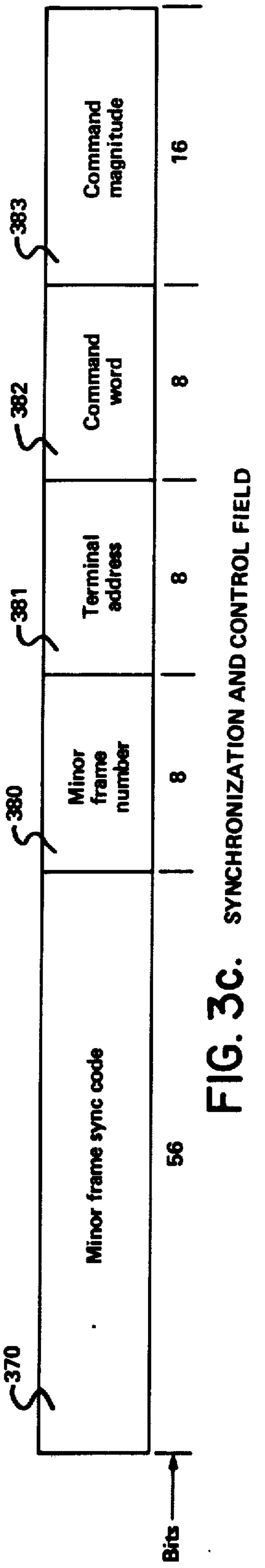
FIG. 3c. SYNCHRONIZATION AND CONTROL FIELD

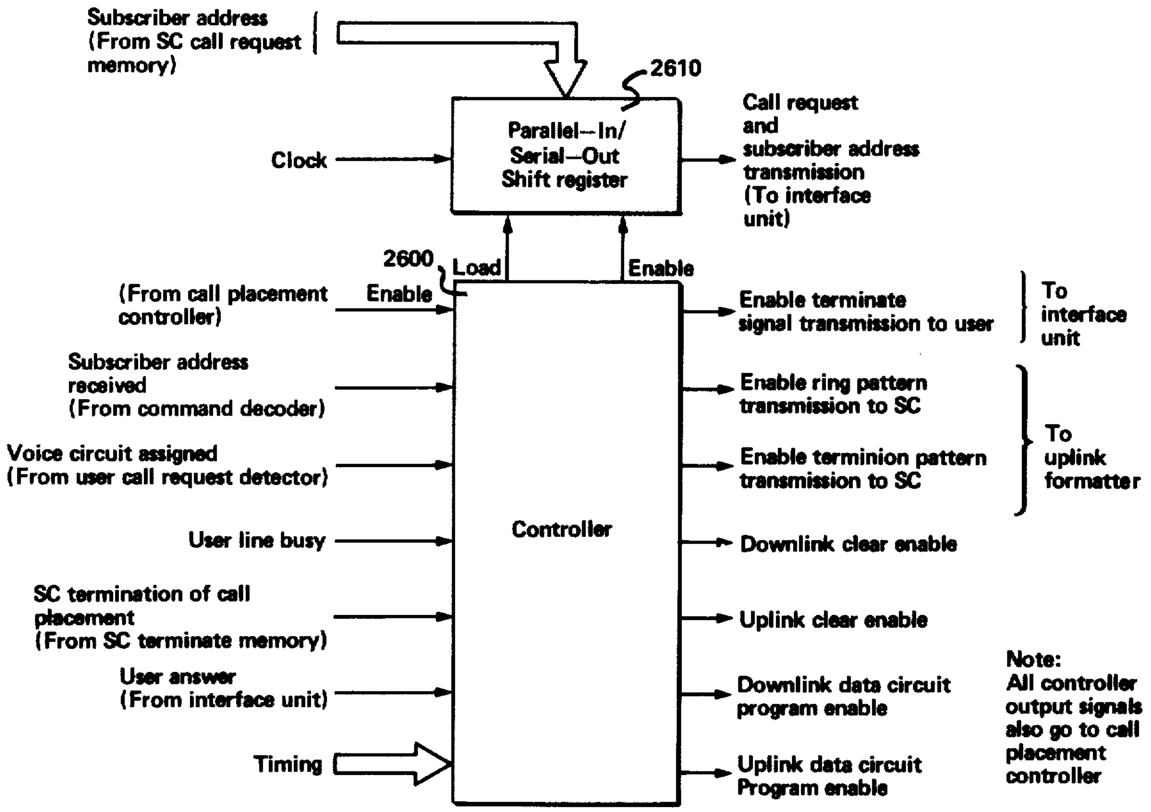
FIG. 26. SPACE CRAFT CALL MODE CONTROLLER
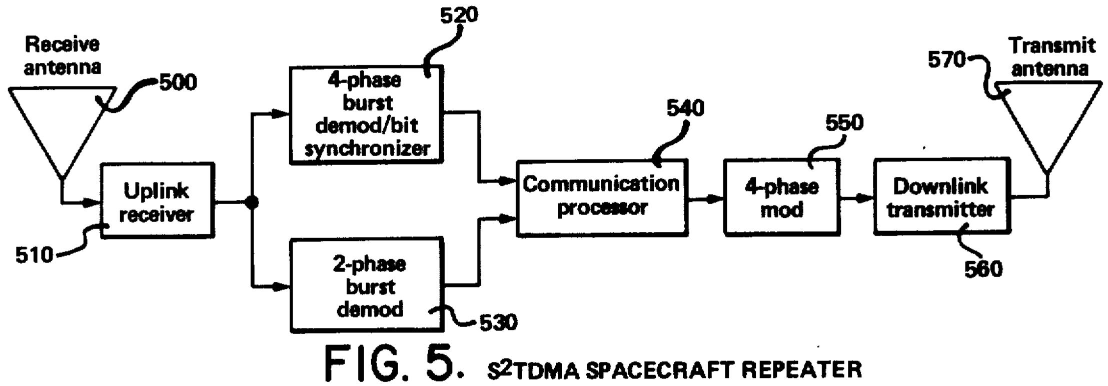
FIG. 5. S2TDMA SPACECRAFT REPEATER

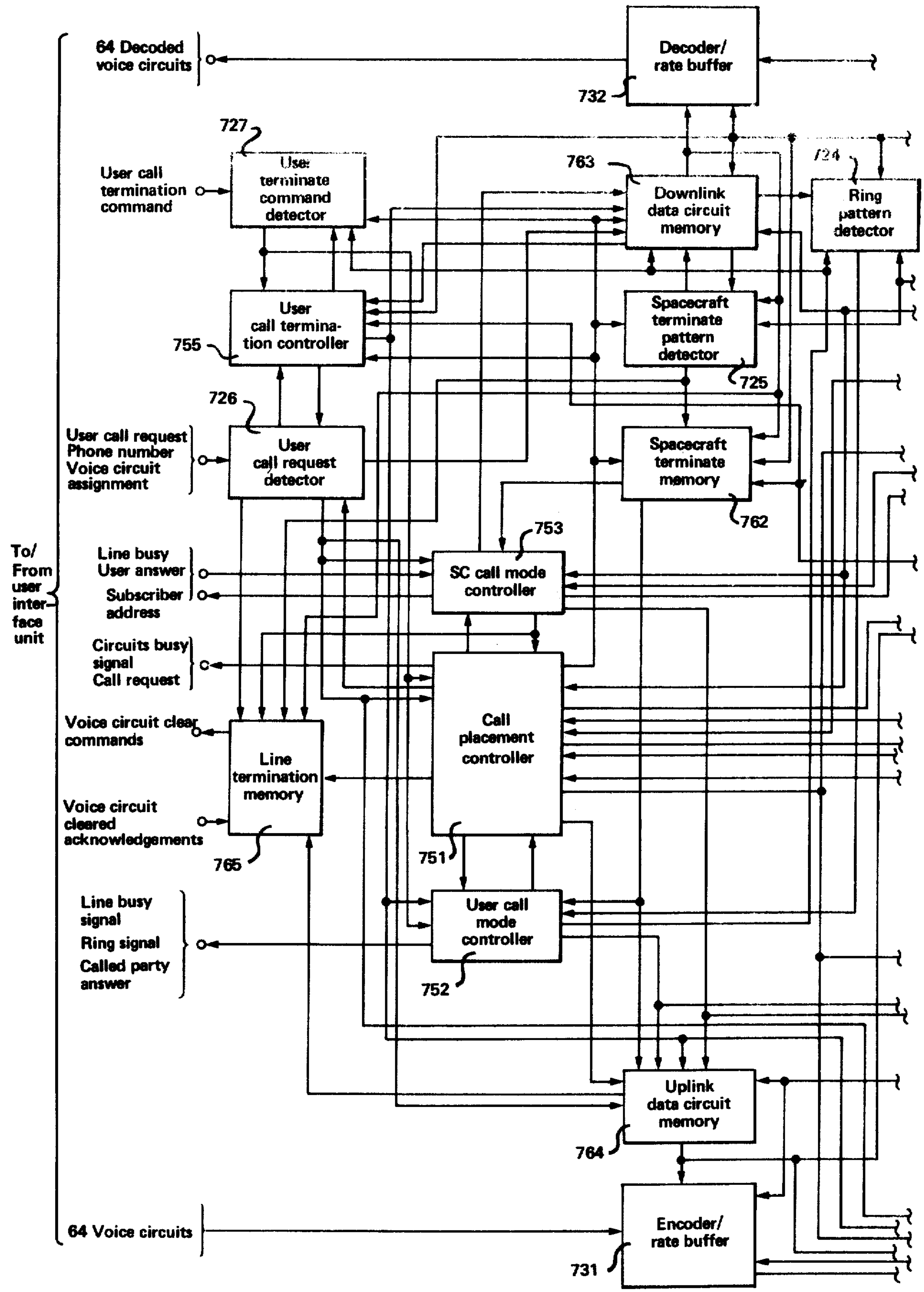
FIG. 7A. DATA TERMINAL DIGITAL EQUIPMENT

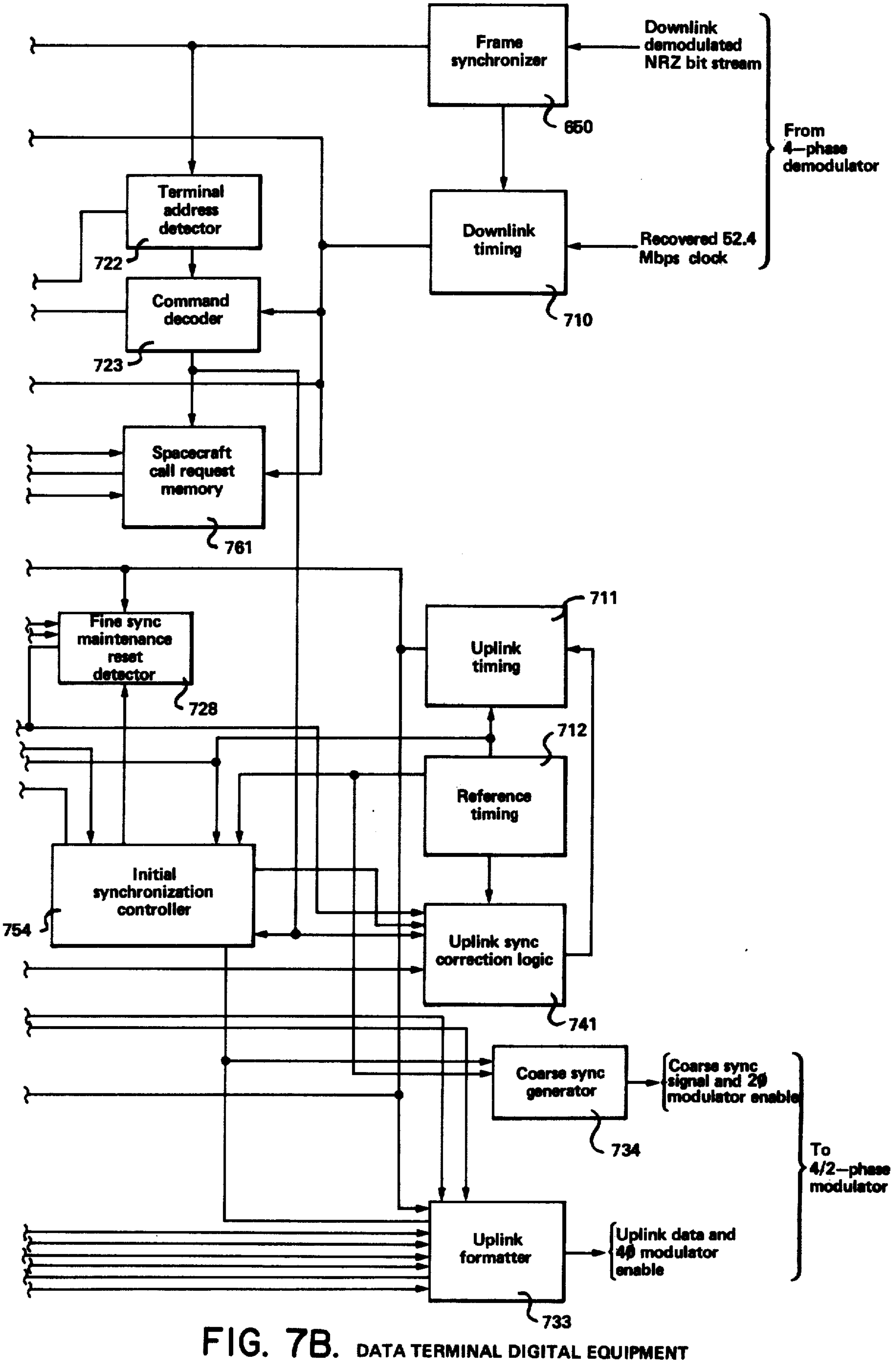
FIG. 7B. DATA TERMINAL DIGITAL EQUIPMENT

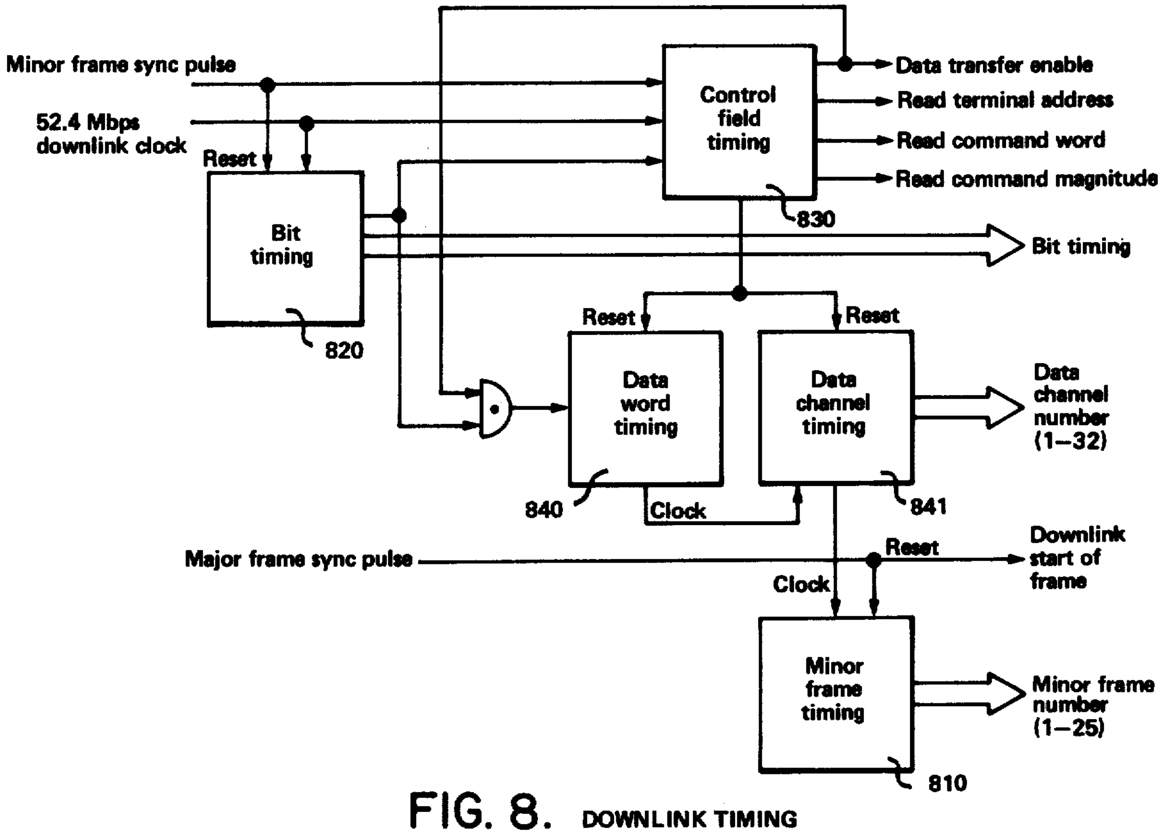
FIG. 8. DOWNLINK TIMING
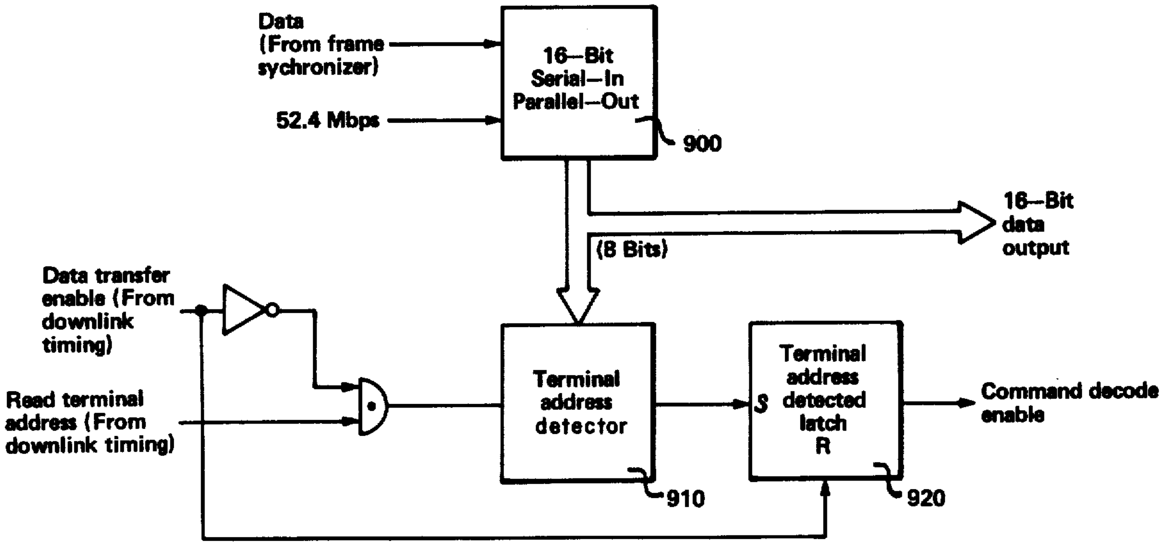
FIG. 9. TERMINAL ADDRESS DETECTOR

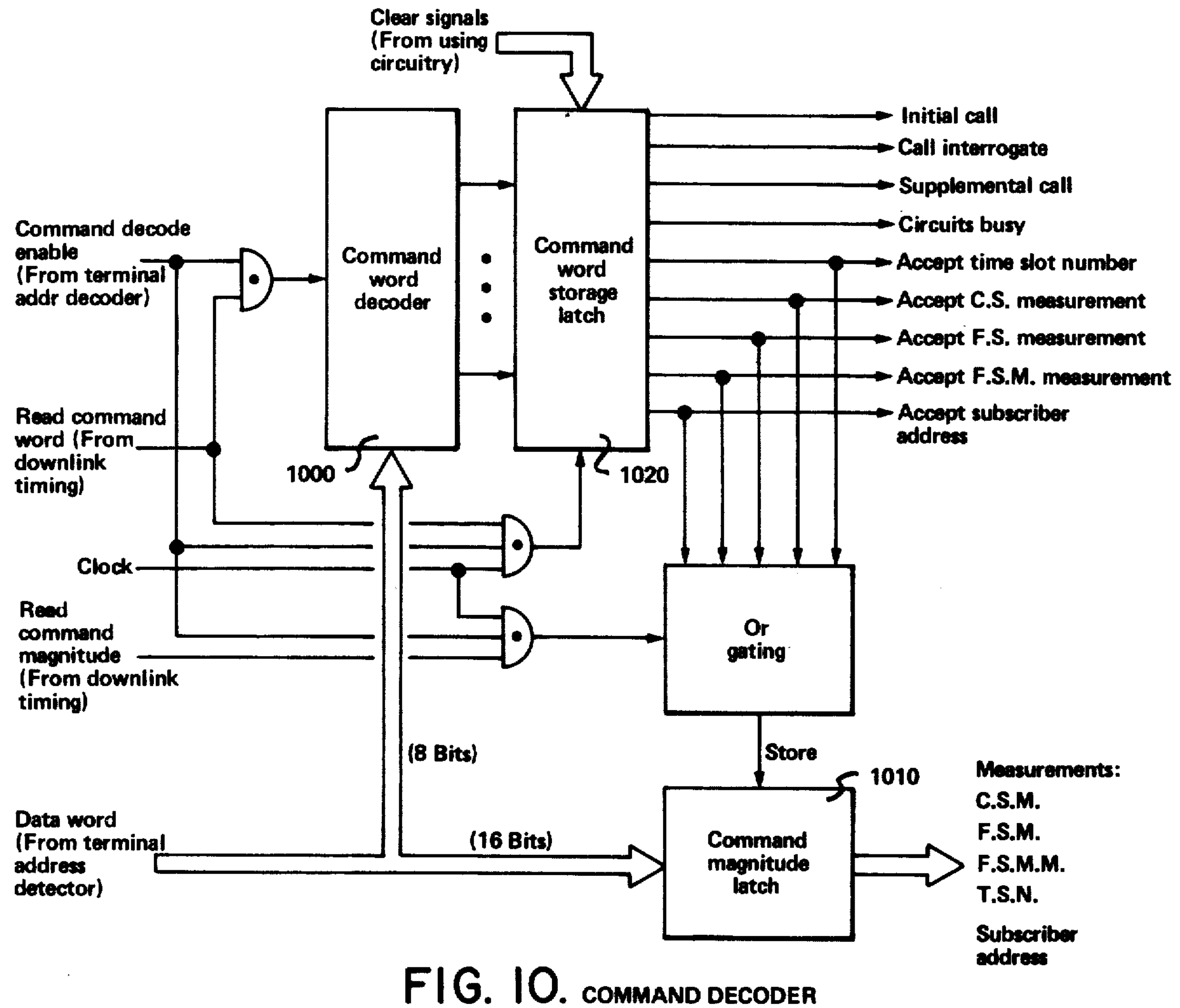
FIG. 10. COMMAND DECODER
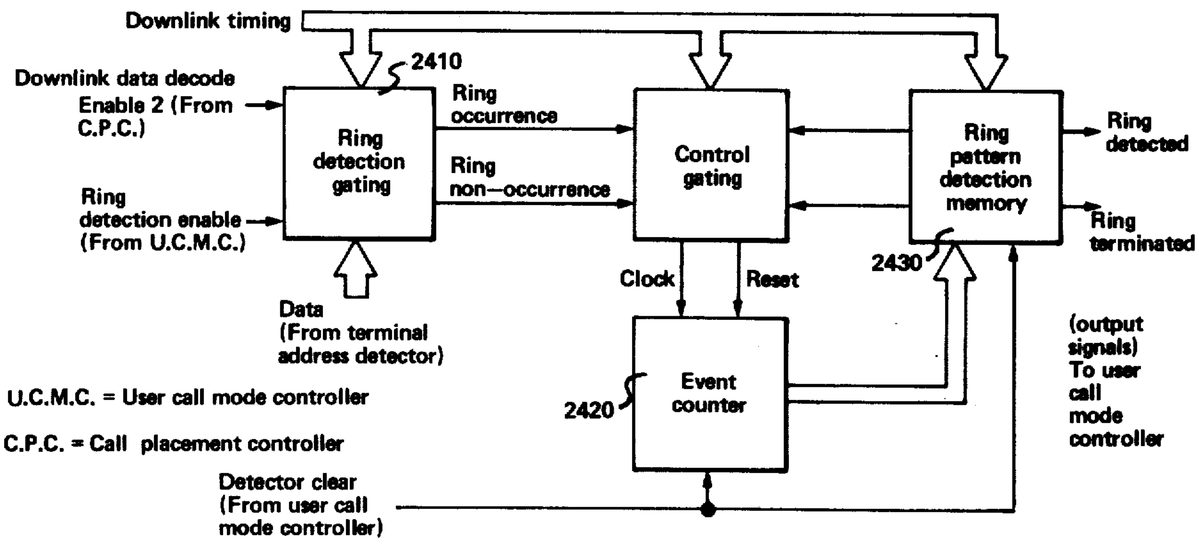
FIG. 24. RING PATTERN DETECTOR

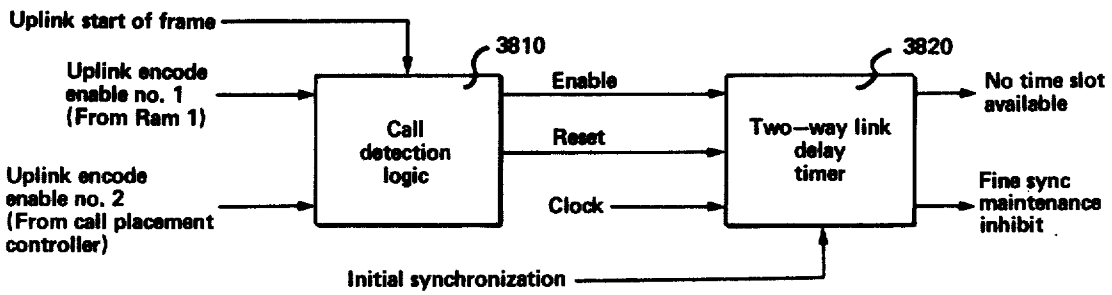
FIG. 38. FINE SYNC MAINTENANCE RESET DETECTOR
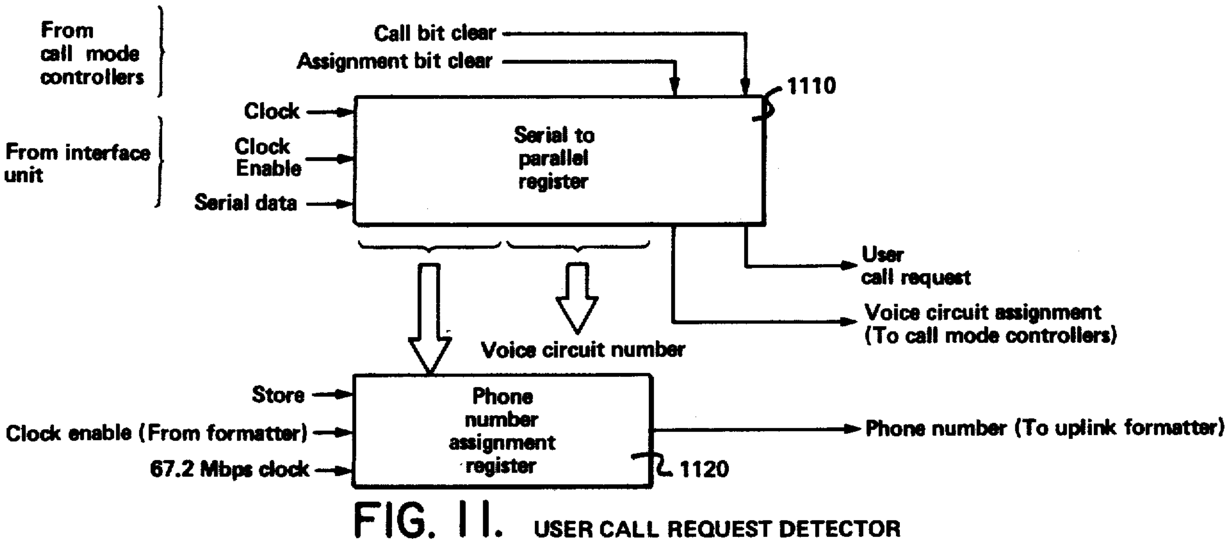
FIG. 11. USER CALL REQUEST DETECTOR
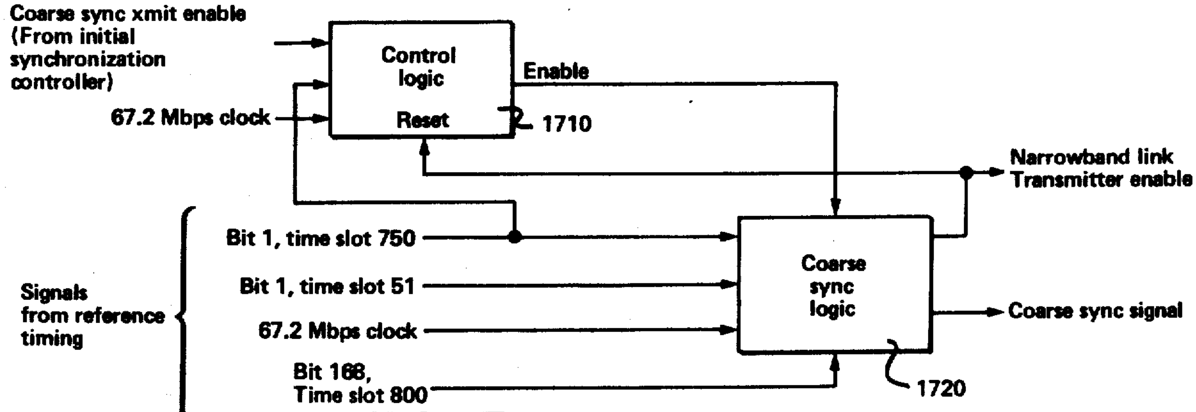
FIG. 17. COARSE SYNC GENERATOR
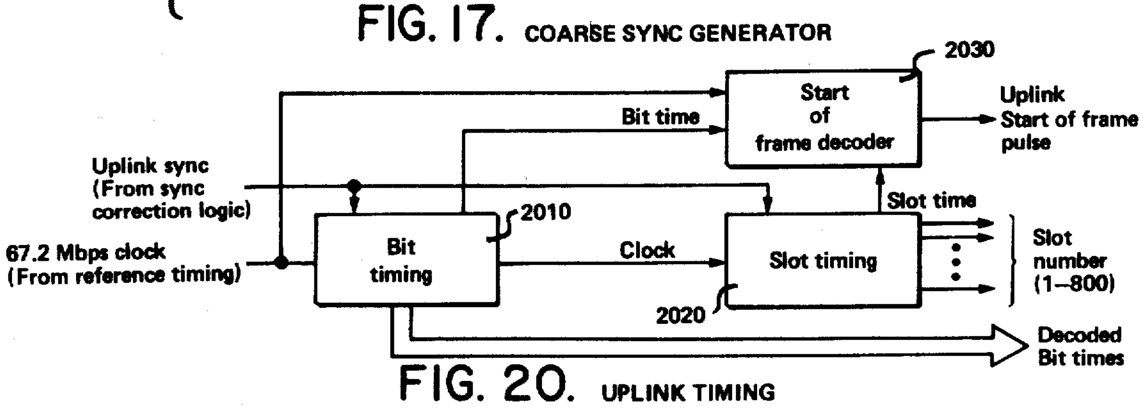
FIG. 20. UPLINK TIMING

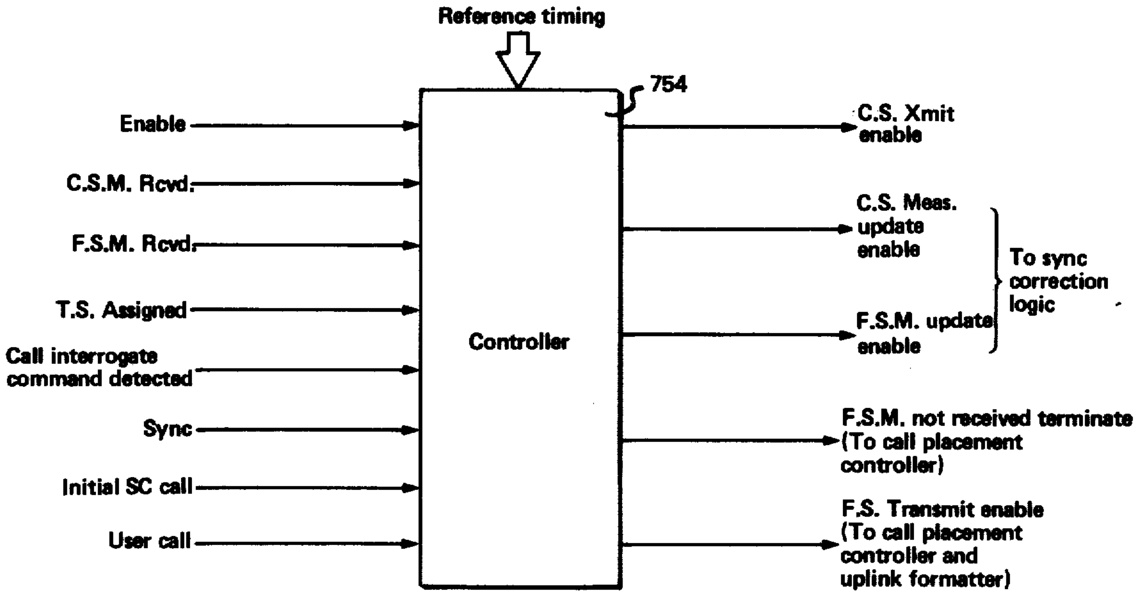
FIG. 15. INITIAL SYNCHRONIZATION CONTROLLER
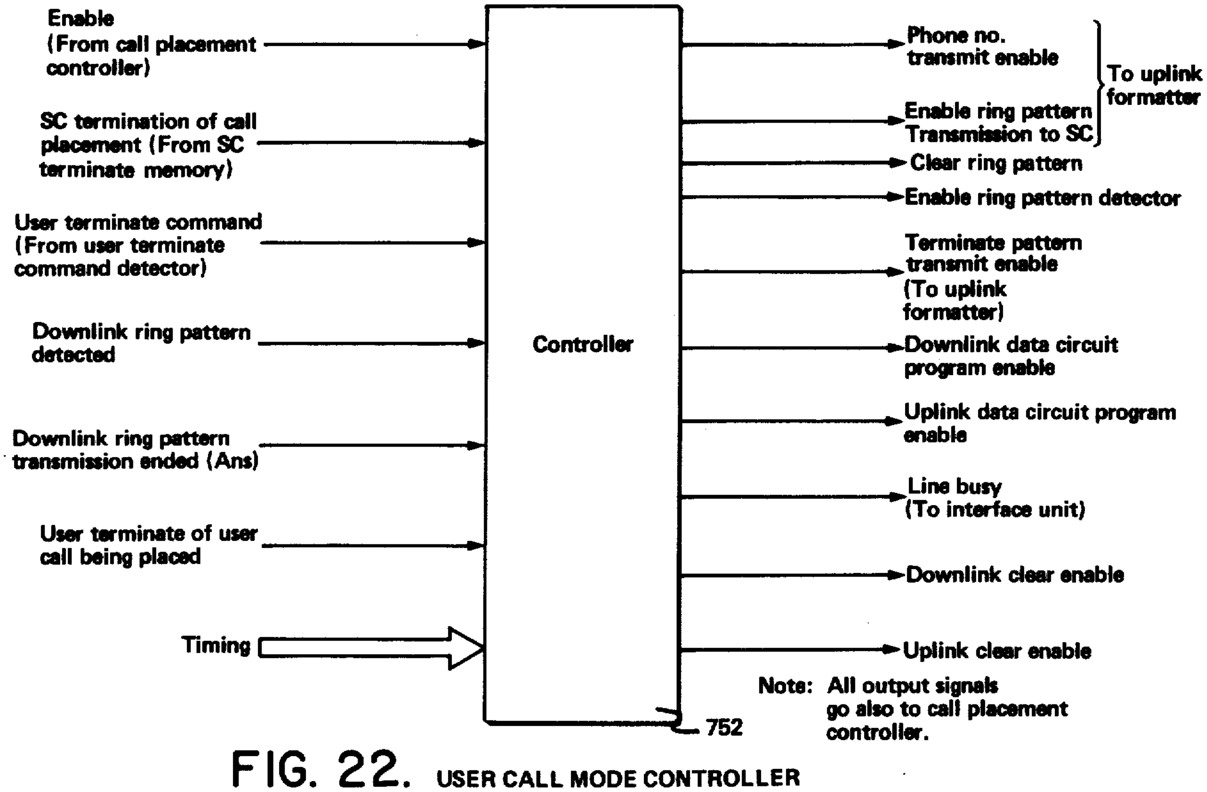
FIG. 22. USER CALL MODE CONTROLLER
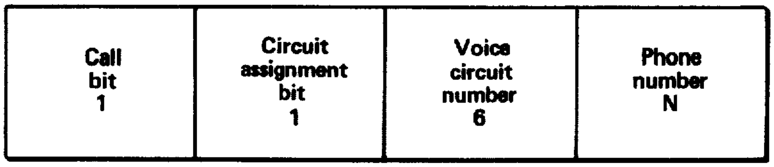
FIG. 12. USER CALL REQUEST FORMAT

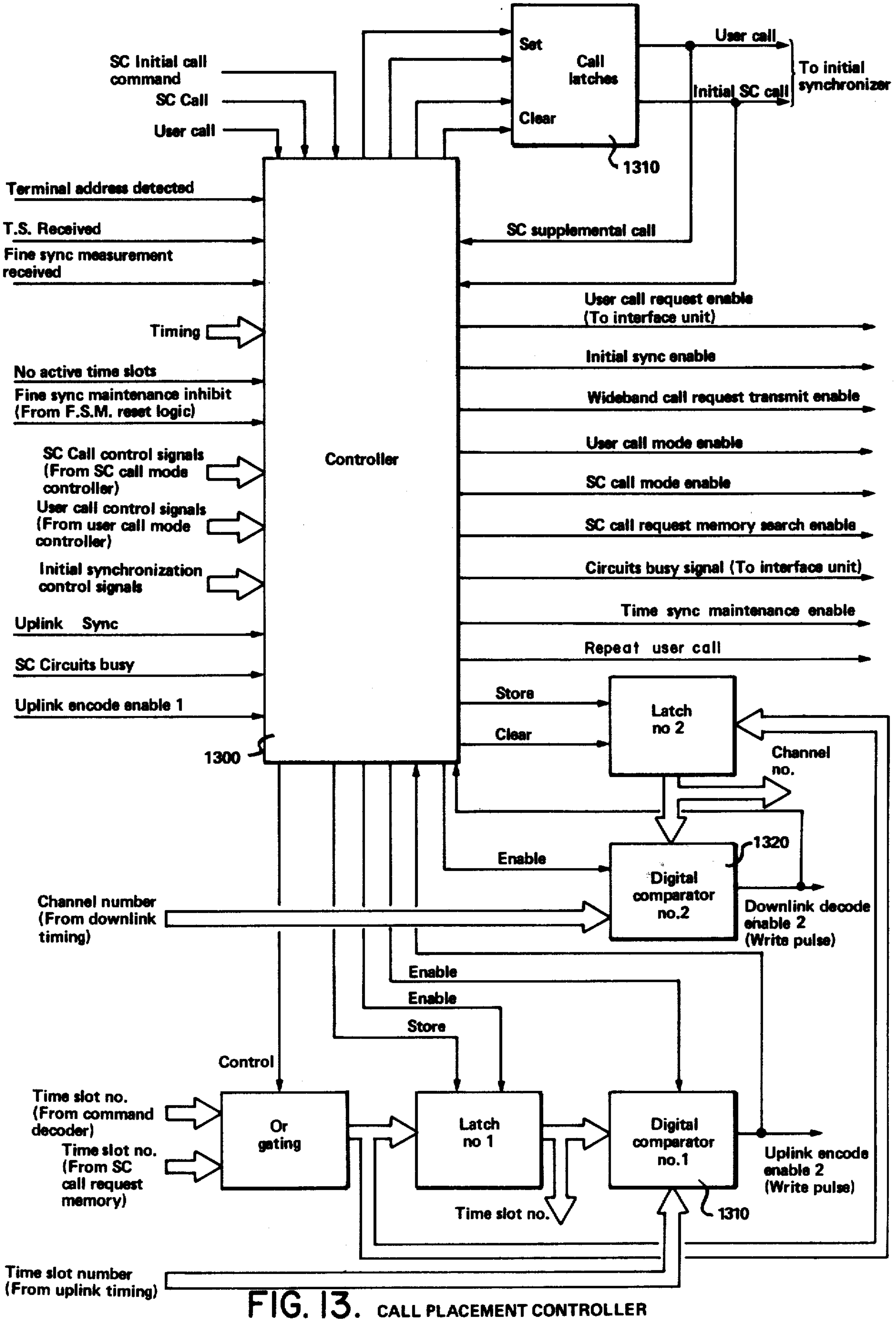
FIG. 13. CALL PLACEMENT CONTROLLER

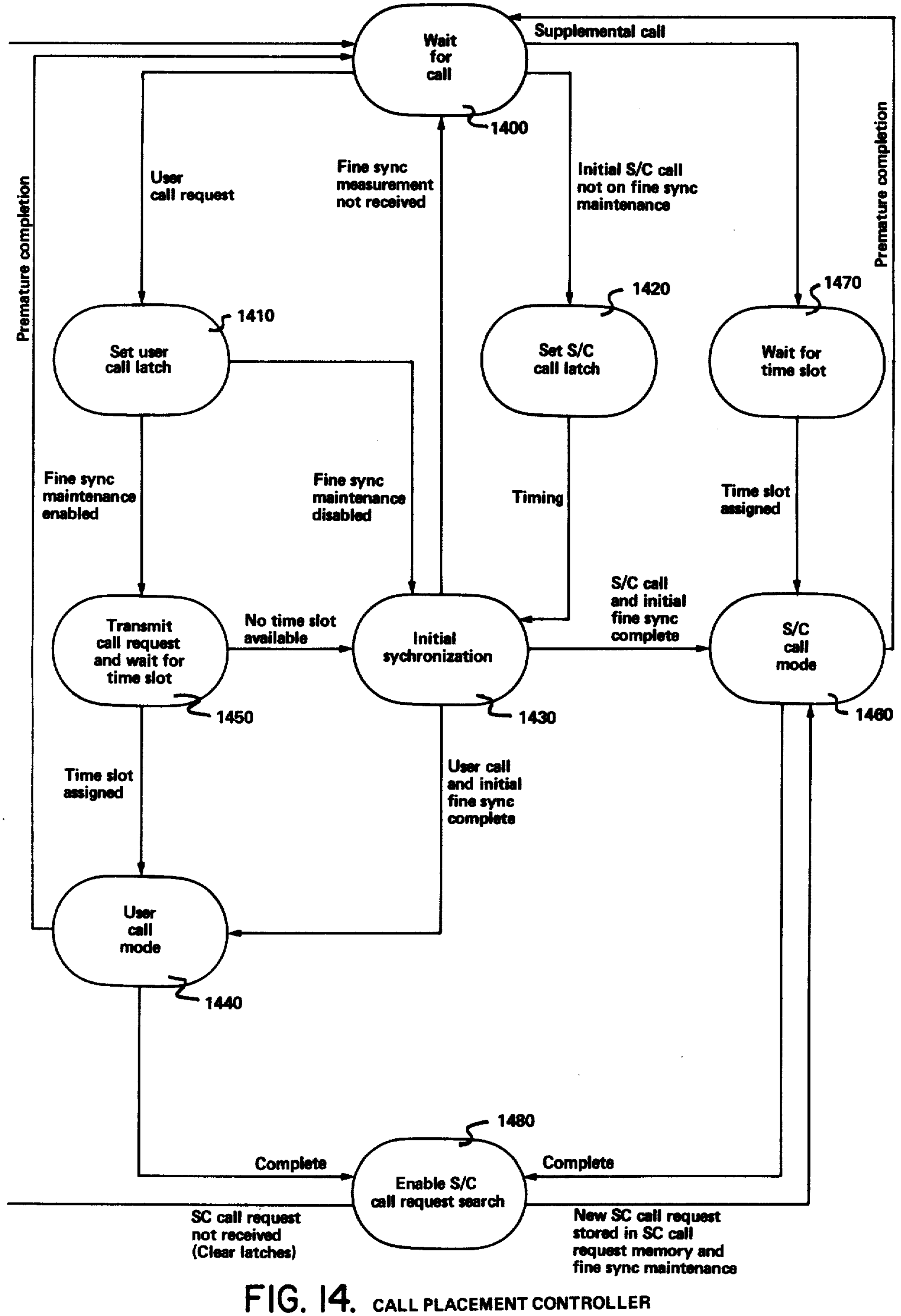
FIG. 14. CALL PLACEMENT CONTROLLER

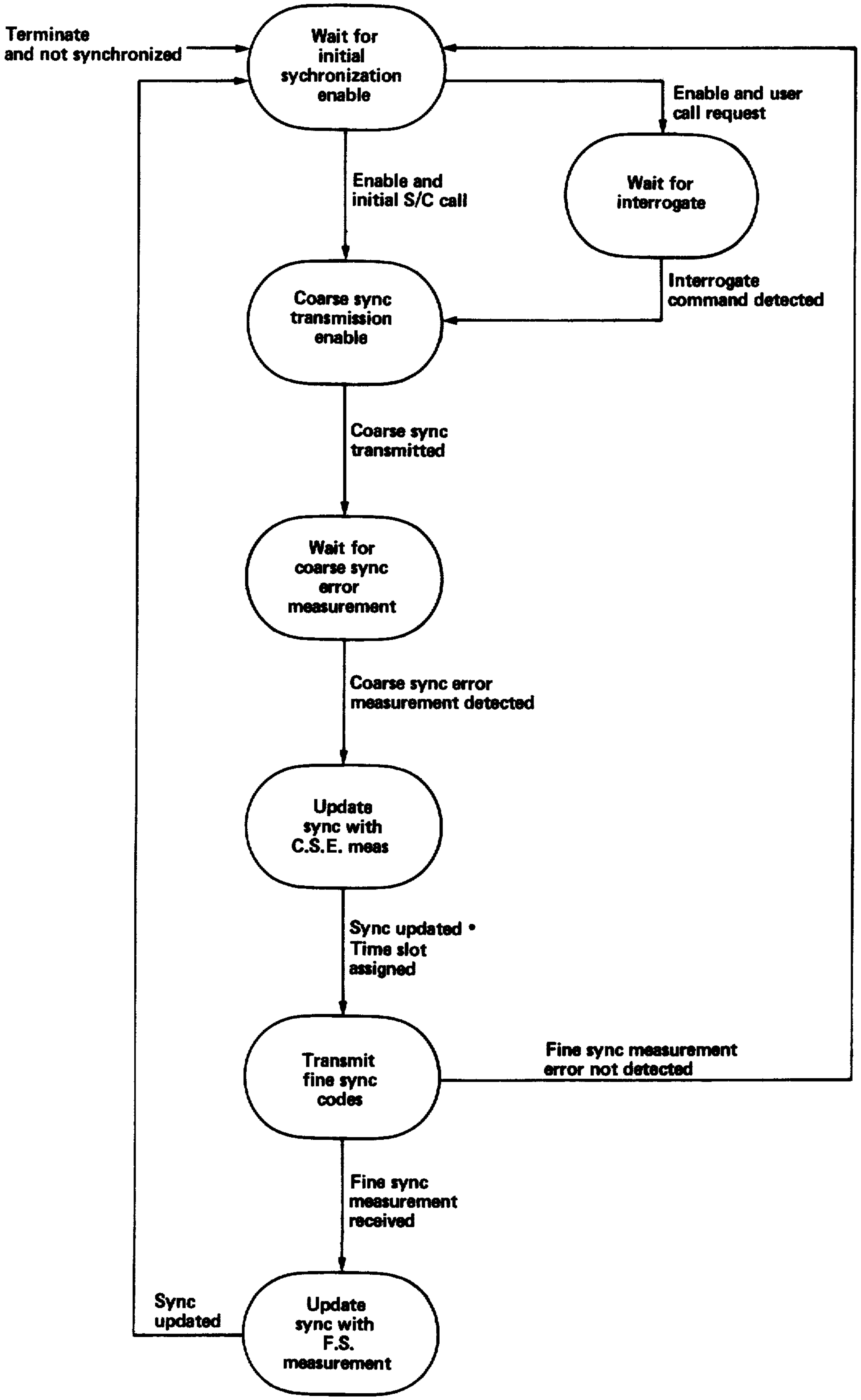
FIG. 16. INITIAL SYNCHRONIZATION CONTROLLER

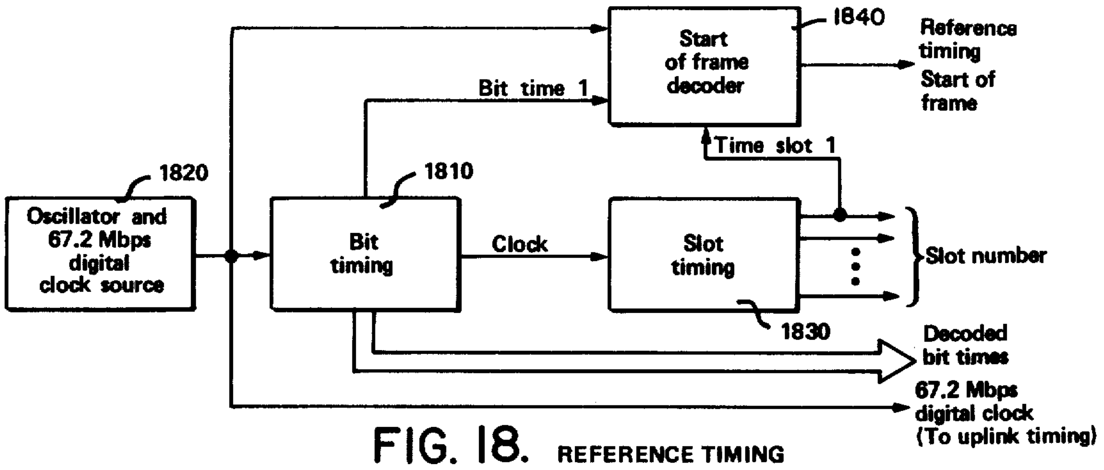
FIG. 18. REFERENCE TIMING
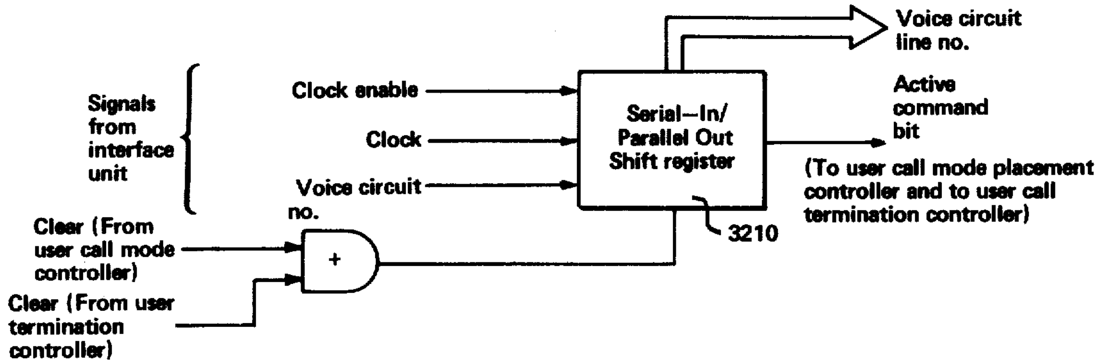
FIG. 32. USER TERMINATE COMMAND DETECTOR
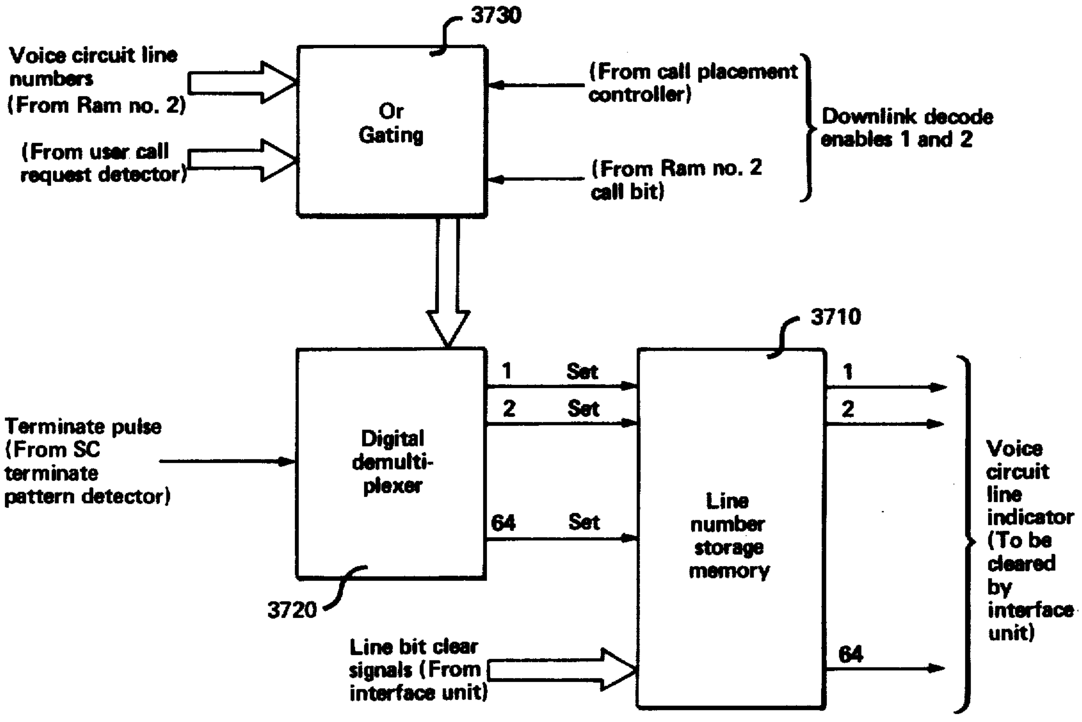
FIG. 37. LINE TERMINATION MEMORY

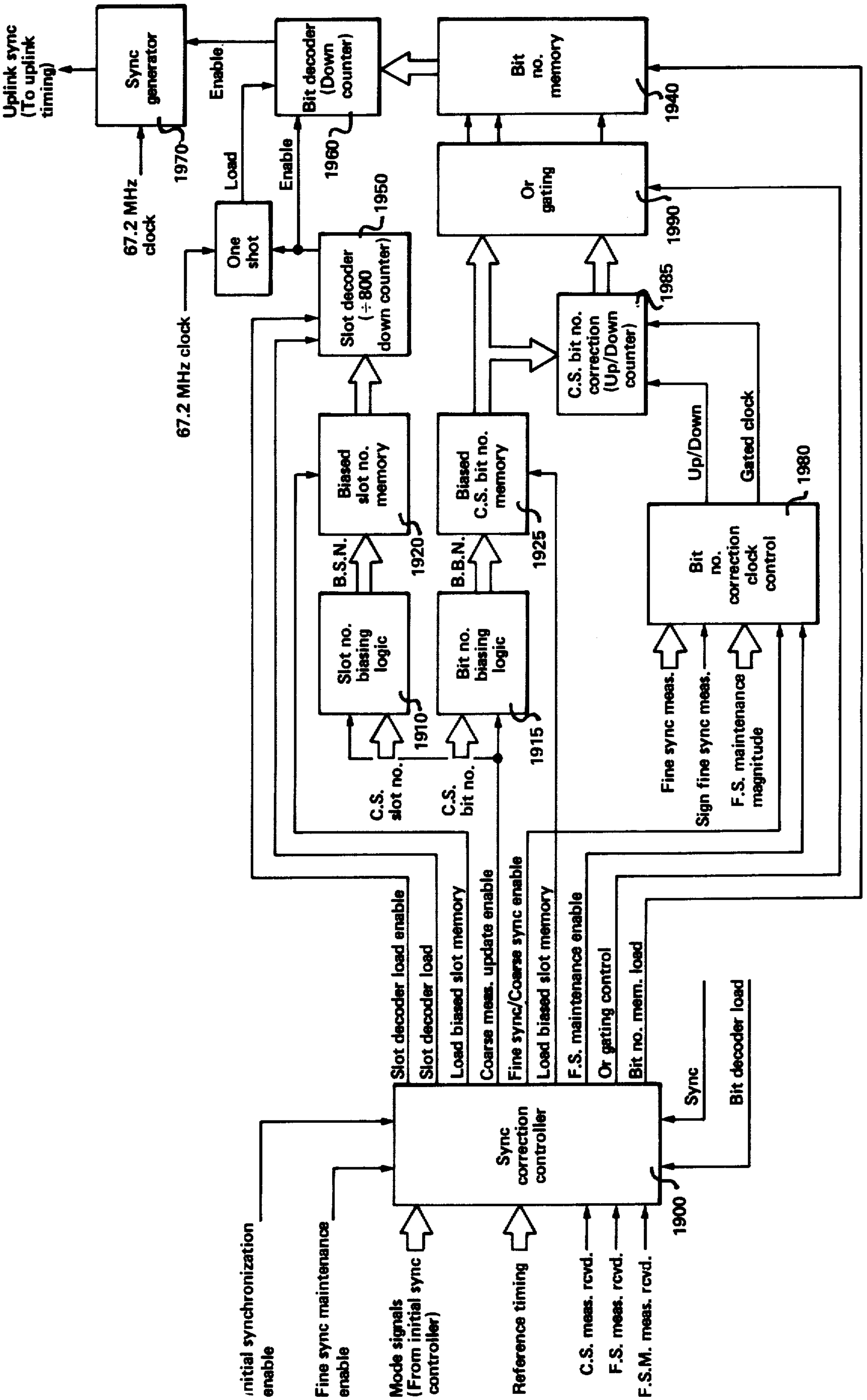
FIG. 19. UPLINK SYNC CORRECTION LOGIC

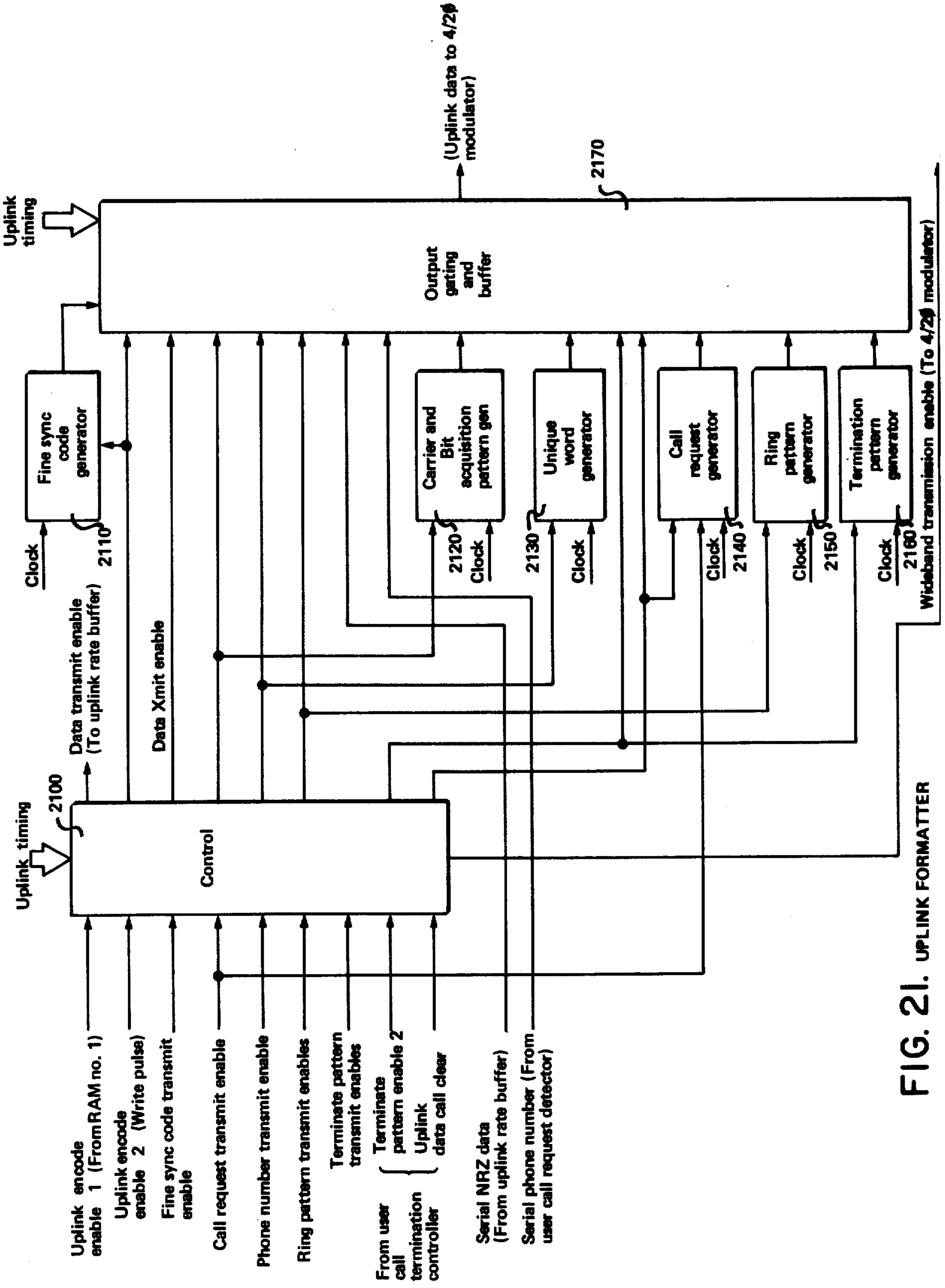
FIG. 21. UPLINK FORMATTER

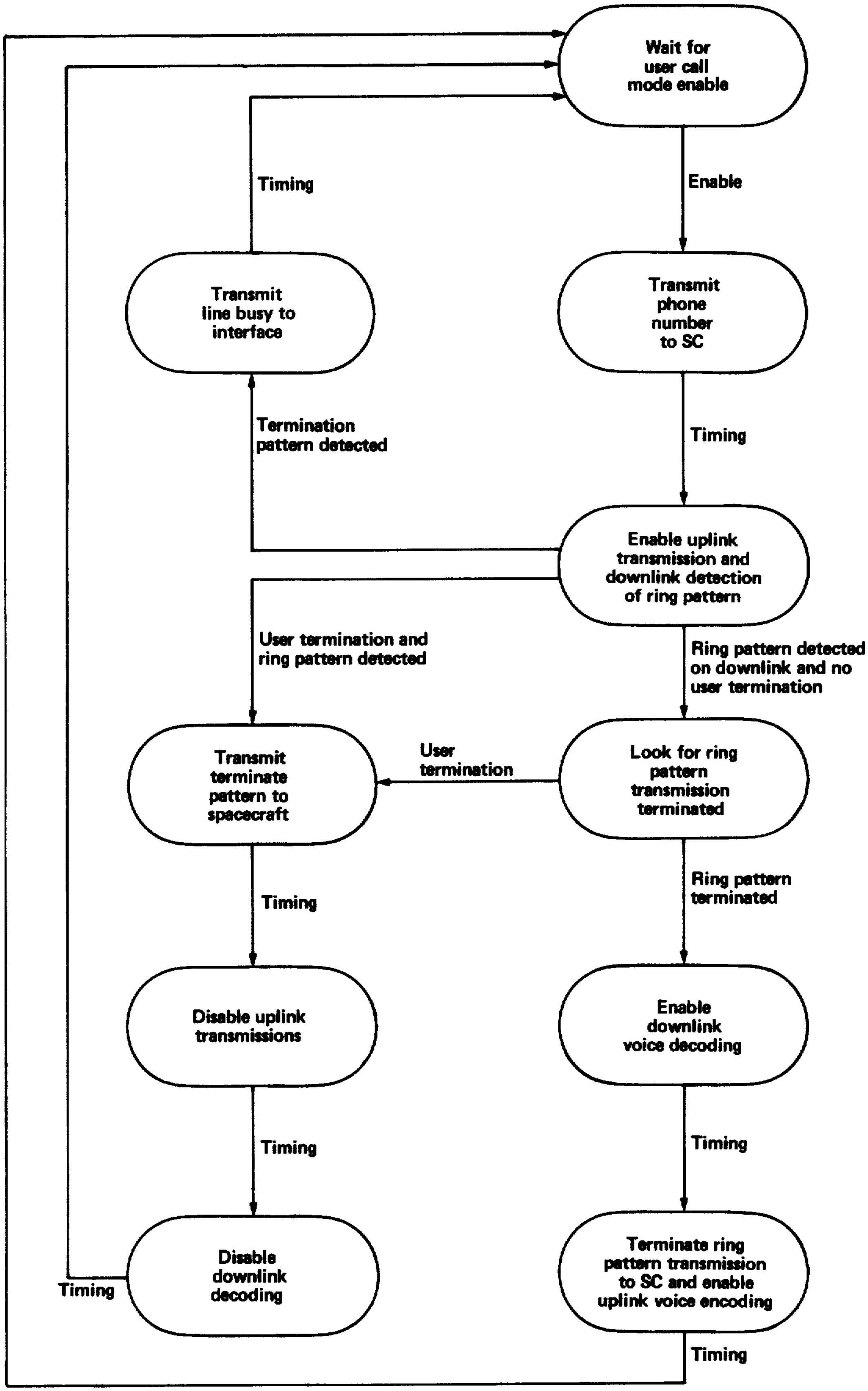
FIG. 23. USER CALL MODE CONTROLLER STATE DIAGRAM

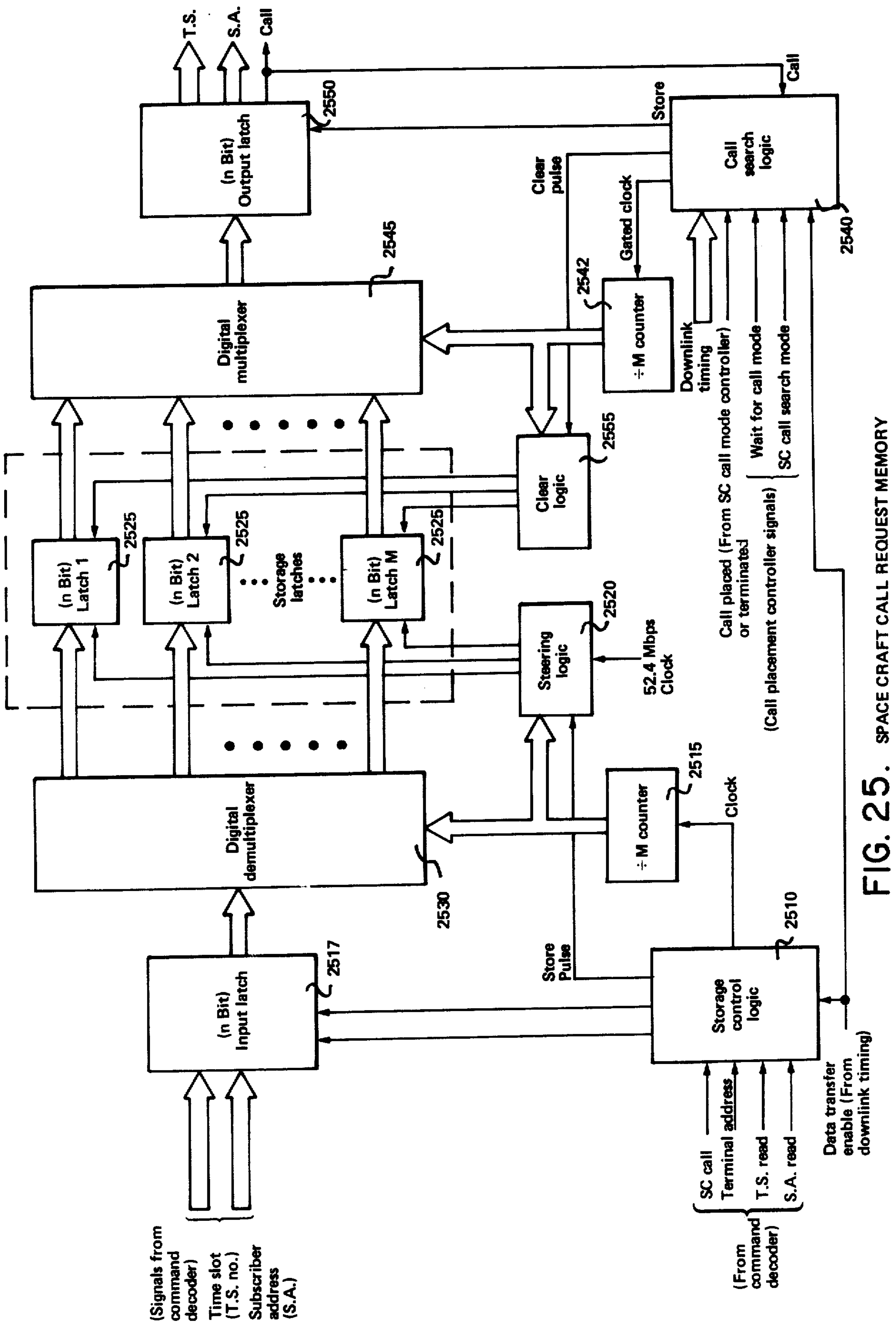
FIG. 25. SPACE CRAFT CALL REQUEST MEMORY

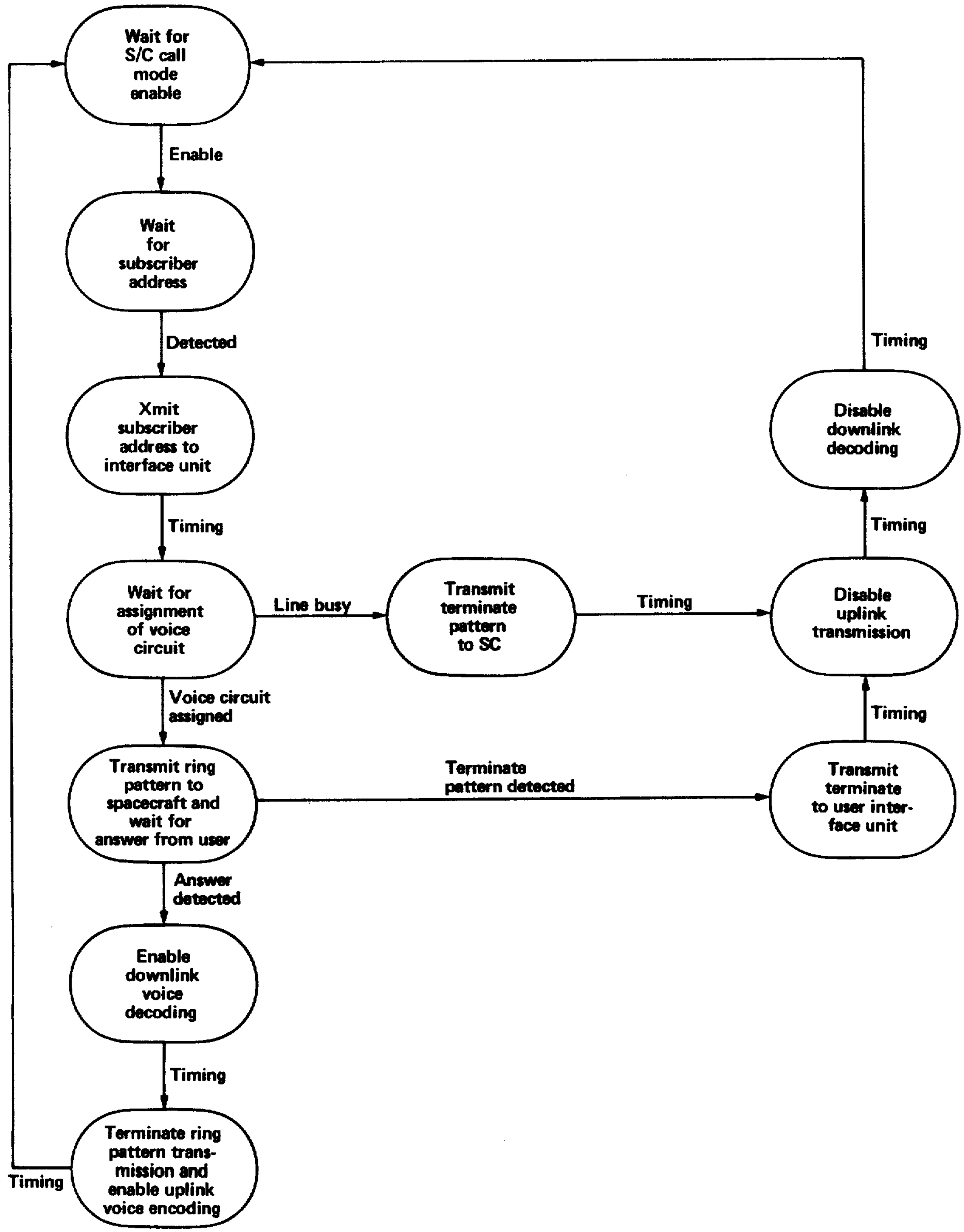
FIG. 27. SPACECRAFT CALL MODE CONTROLLER

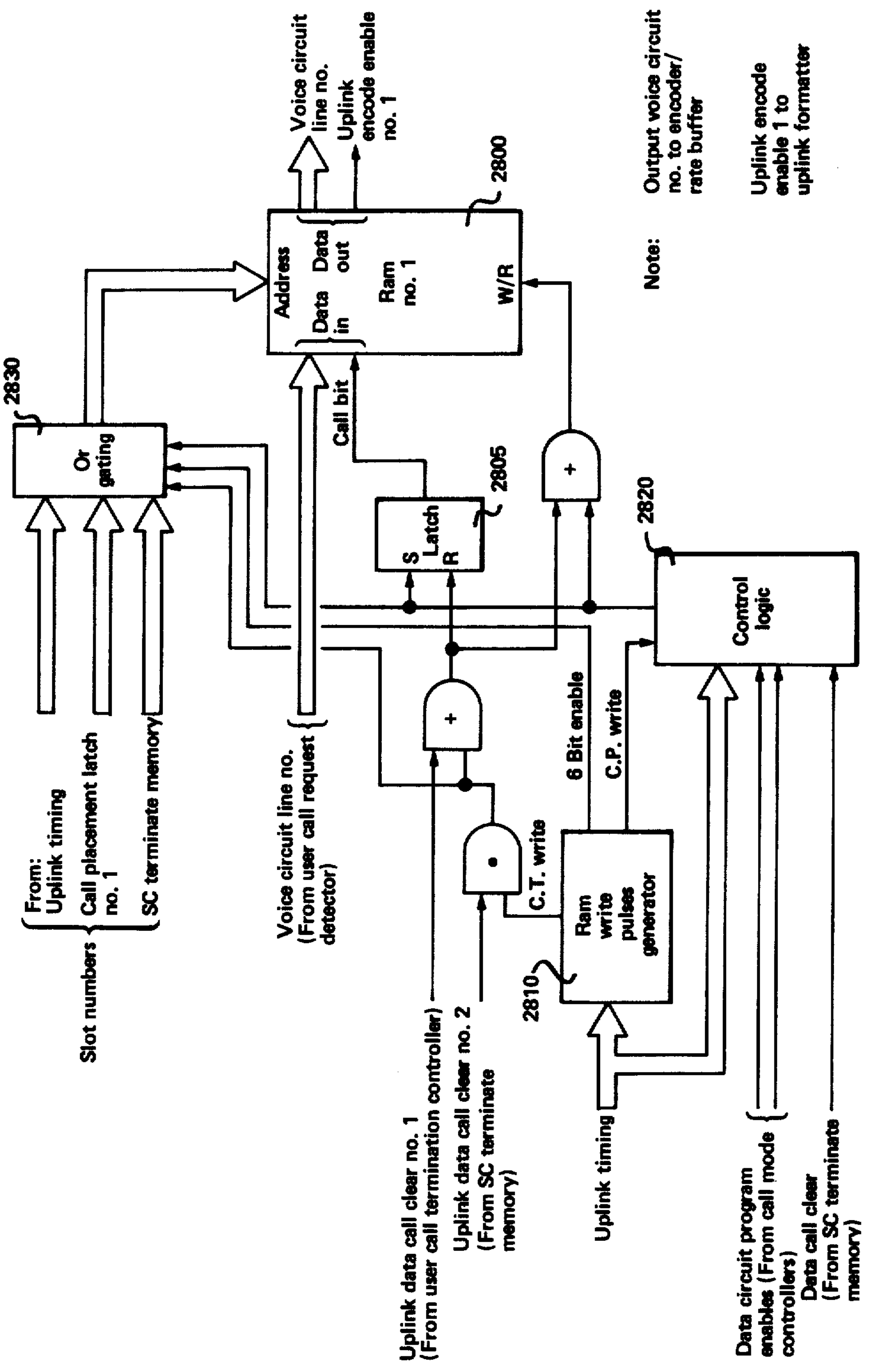
FIG. 28. UPLINK DATA CIRCUIT MEMORY

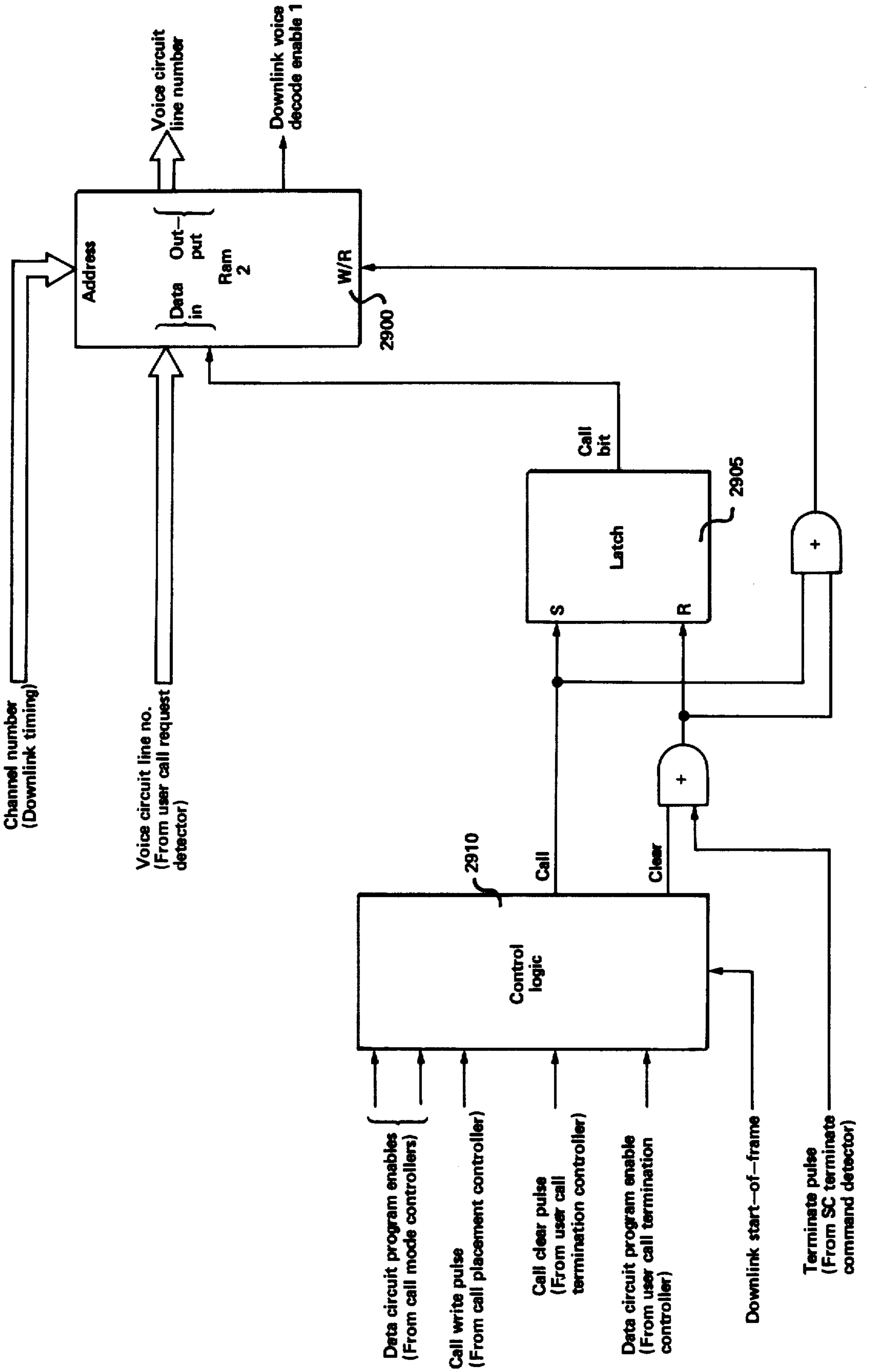
FIG. 29. DOWNLINK DATA CIRCUIT MEMORY

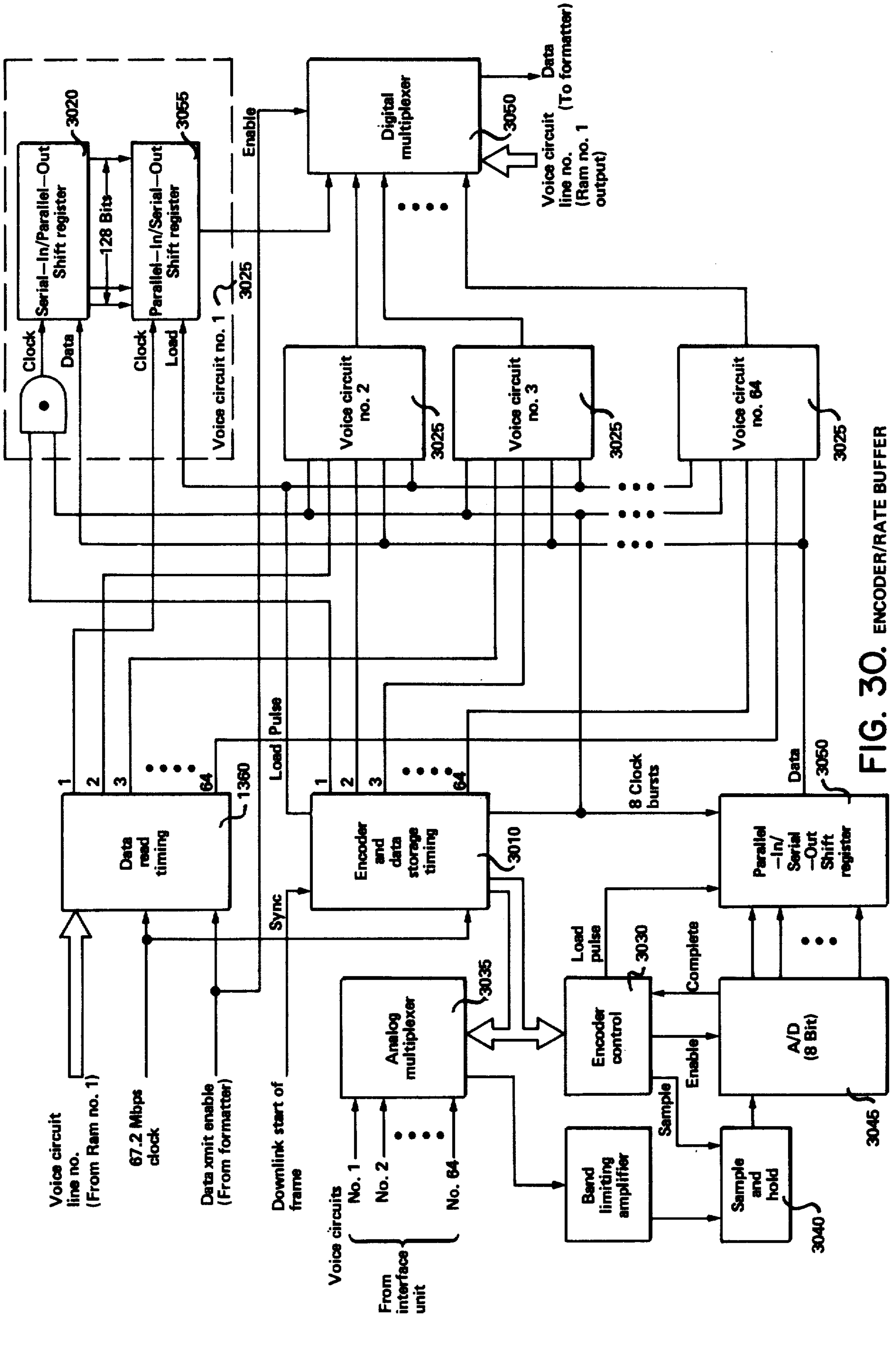
FIG. 30. ENCODER/RATE BUFFER

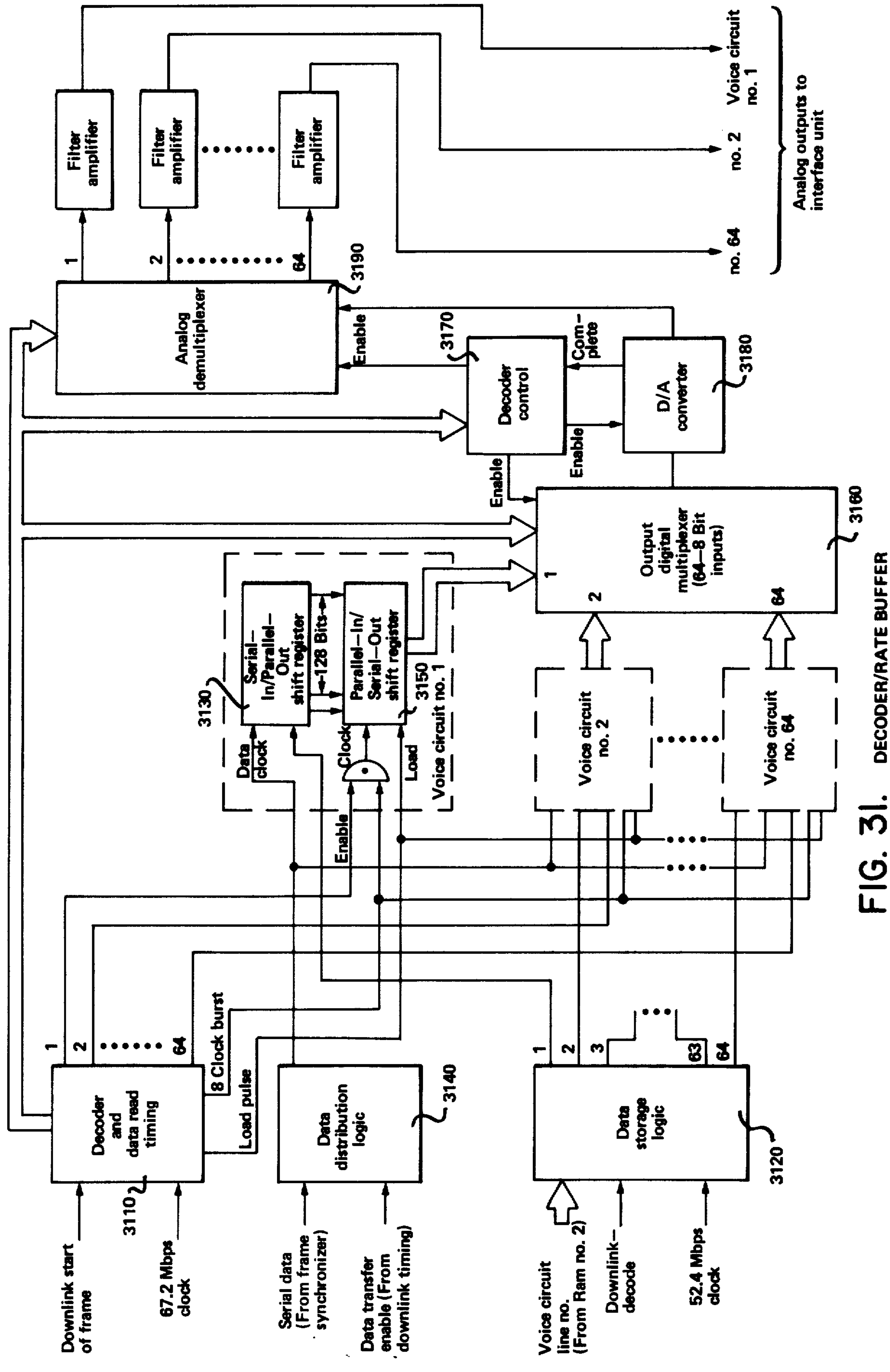
FIG. 31. DECODER/RATE BUFFER

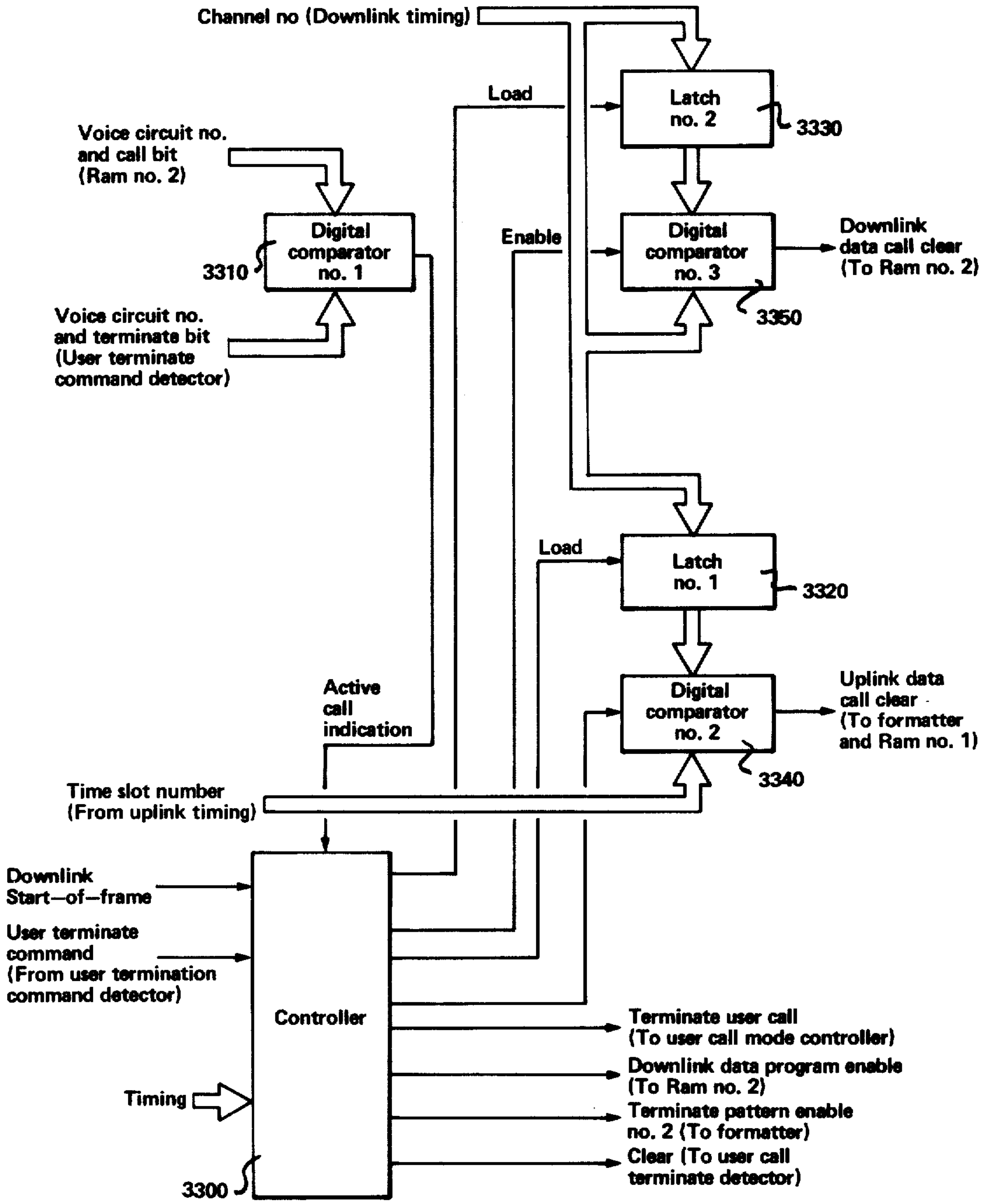
FIG. 33. USER CALL TERMINATION CONTROLLER

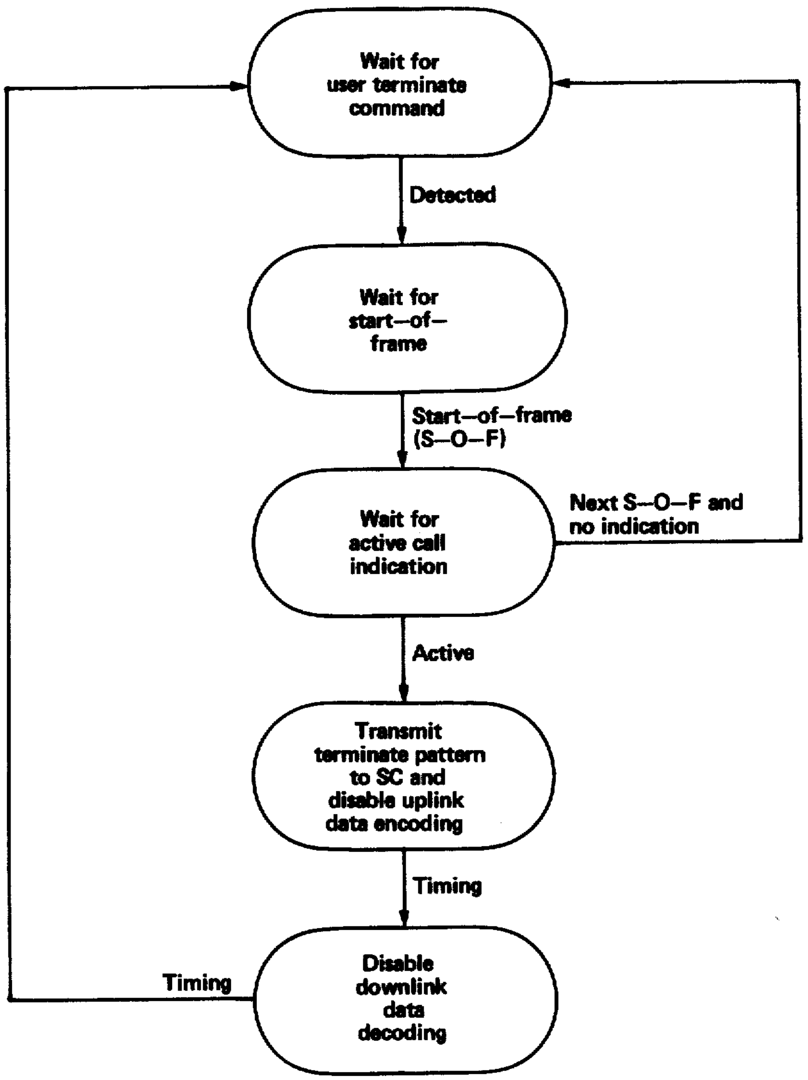
FIG. 34. USER CALL TERMINATION CONTROLLER

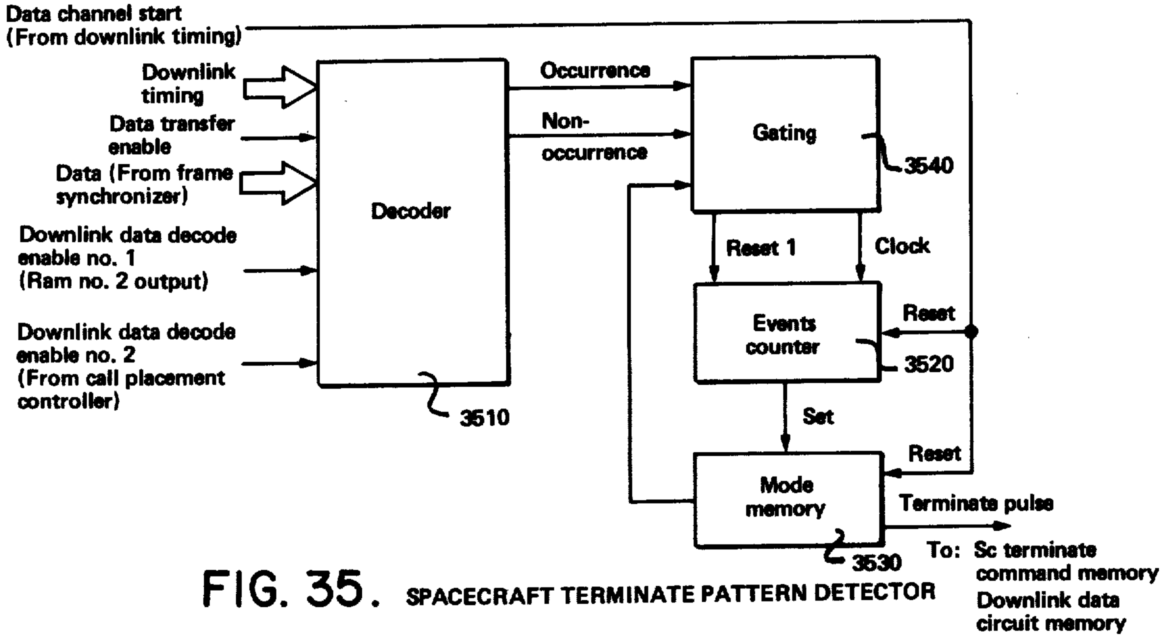
FIG. 35. SPACECRAFT TERMINATE PATTERN DETECTOR
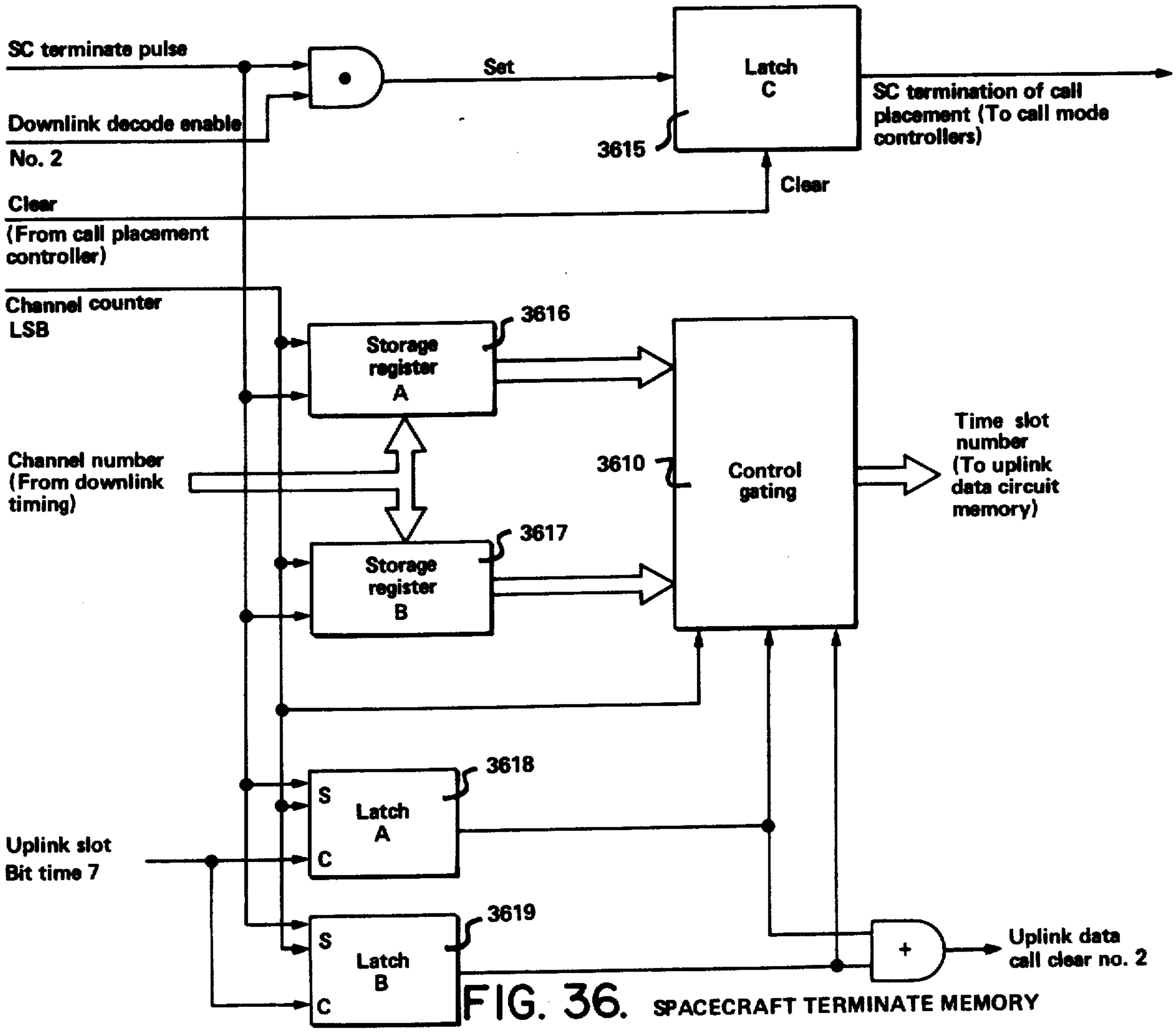
FIG. 36. SPACECRAFT TERMINATE MEMORY

DATA TERMINAL FOR USE WITH TDMA PROCESSING REPEATER

BACKGROUND OF THE INVENTION

The present invention relates generally to time division multiple access (TDMA) communication systems, and more particularly to data terminals for such systems which are responsive to synchronization error measurements and other control data.

In a satellite relay TDMA communication system, or other time division multiple access communication system involving multiple end points (data terminals) with a varying link delay between the end points and a common repeater (transponder), it is necessary to provide a guard time between transmission bursts from the different data terminals, and to synchronize the transmissions from the various terminals so that they do not overlap in time and interfere with one another as they are received at the repeater. In some prior art systems, such as represented by U.S. Pat. No. 3,562,432, one of the data terminals is designated a master and the other terminals are slaves. In such a system, each slave terminal must measure the difference in time between a synchronizing signal from the master terminal and a synchronizing signal from the particular slave terminal (after both have been relayed by a transponder on the satellite). Such systems have the disadvantage of requiring the guard time (required in uplink transmissions in order to prevent overlap at the transponder), to be also provided in the downlink from the relay to the data terminals, in order that the data terminal can make the error measurement.

In some prior art TDMA communication systems, such as represented by U.S. Pat. No. 3,634,627, a demand assignment mode of operation is provided by allowing each terminal to seize any available channel. In the type of system represented by U.S. Pat. No. 3,644,678, surplus channels are allocated among the several data terminals according to a predetermined algorithm and each data terminal is required to remember the number of channels presently in use by each data terminal as well as the additional requirements of each terminal. Then, in response to a "freeze" signal, the surplus channels can be re-allocated by data terminals. Both types of systems have the disadvantage of requiring complex circuitry at each data terminal, which results in costly duplication of equipment within the system.

SUMMARY OF THE INVENTION

Accordingly, it is one object of the present invention to provide a data terminal capable of receiving downlink data free from guard time, thereby allowing more efficient use of the downlink bandwidth.

A second object of the present invention is to provide a data terminal responsive to the demand assignment of communication channels by a processing repeater.

A third object of the present invention is to provide data terminals capable of transmitting coarse synchronization signals in response to an interrogation command, without interfering with transmissions from other terminals.

A fourth object of the present invention is to reduce data terminal complexity.

A fifth object of the present invention is to provide a data terminal suitable for use in a Spacecraft Synchronized Time Division Multiple Access Communication System.

The invention which satisfies these and other objectives may be briefly summarized as follows. Each individual data terminal monitors the continuous output transmission from the processing repeater, maintaining synchronization with the synchronization and control field thereof and decoding those commands directed to the particular data terminal. In response to a command from the processing repeater, the individual data terminal is capable of transmitting a narrowband coarse synchronization signal having a transition at a predetermined time within its reference timing. Upon receipt of a coarse synchronization error command, the individual terminal is able to adjust its transmission timing to attain synchronization with the rest of the system. Thus, rapid initial acquisition is possible without interfering with concurrent wideband data transmissions from other active terminals. In the particular embodiment disclosed, the data terminal is also capable of transmitting a wideband fine synchronization signal and responding to fine synchronization error and fine synchronization error maintenance commands.

In accordance with another aspect of the present invention, each individual data terminal transmits uplink data in the burst fashion normally associated with TDMA communication systems, but receives a continuous stream of downlink data at a second, narrower bandwidth; thereby improving the downlink signal-to-noise ratio.

In accordance with yet another aspect of the present invention, each individual data terminal may initiate a call by means of a narrowband or wideband call request (from an inactive or active terminal respectively), transmitting in a time slot assigned by the processing repeater in response to the particular call request, thus permitting a fully variable, demand assignment mode of operation.

The foregoing and other objectives and features of the invention will be more apparent upon examination of the accompanying drawings and the detailed description of a preferred embodiment which follow. It should be noted that in the drawings, the convention has been adopted of using the number of the FIGURE where a detail is first shown as the first digit of the reference numeral for that detail.

BRIEF DESCRIPTION OF THE DRAWINGS

FIG. 1 shows a Spacecraft Synchronized Time Division Multiple Access ($S^2$TDMA) Communication System utilizing the Processing Repeater of the present invention.

FIG. 2 (encompassing FIGS. 2*a*, 2*b*, and 2*c*), illustrates various Wideband Uplink Formats used by the disclosed embodiment.

FIG. 3 (encompassing FIGS. 3*a*, 3*b*, and 3*c*) illustrates the Downlink Frame Format used by the disclosed embodiment.

FIG. 4 shows the format of a Narrowband Coarse Synchronization Signal.

FIG. 5 is a simplified block diagram of an $S^2$TDMA Processing Repeater; while FIG. 6 is a simplified block diagram of a Data Terminal suitable for use in an $S^2$TDMA system.

FIG. 7 (comprising FIGS. 7*a* and 7*b*) is a functional block diagram of the Digital Equipment portion of a Data Terminal in accordance with the present invention.

FIGS. 8 through 38 are detailed block diagrams, state diagrams and timing diagrams for various detectors, controllers, memories, counters, and other circuits of the Data Terminal of FIG. 7.

FIG. 8 is a detailed block diagram for the Downlink Timing circuit.

FIG. 9 is a detailed block diagram for the Terminal Address Detector.

FIG. 10 is a detailed block diagram for the Command Decoder.

FIG. 11 is a detailed block diagram for the User Call Request Detector, while FIG. 12 shows the Format of a User Call Request.

FIG. 13 is a detailed block diagram for the Call Placement Controller, while FIG. 14 is the state diagram corresponding to FIG. 13.

FIG. 15 is a detailed block diagram for the Initial Synchronization Controller, while FIG. 16 is the state diagram corresponding to FIG. 15.

FIG. 17 is a detailed block diagram for the Coarse Sync Generator.

FIG. 18 is a detailed block diagram for the Reference Timing circuit.

FIG. 19 is a detailed block diagram for the Uplink Sync Correction Logic.

FIG. 20 is a detailed block diagram for the Uplink Timing circuit.

FIG. 21 is a detailed block diagram for the Uplink Formatter.

FIG. 22 is a detailed block diagram for the User Call Mode Controller, while FIG. 23 is the state diagram corresponding to FIG. 22.

FIG. 24 is a detailed block diagram for the Ring Pattern Detector.

FIG. 25 is a detailed block diagram for the Spacecraft Call Request Memory.

FIG. 26 is a detailed block diagram for the Spacecraft Call Mode Controller, while FIG. 27 is the state diagram corresponding to FIG. 26.

FIG. 28 is a detailed block diagram for the Uplink Data Circuit Memory.

FIG. 29 is a detailed block diagram for the Downlink Data Circuit Memory.

FIG. 30 is a detailed block diagram for the Encoder/-Rate Buffer.

FIG. 31 is a detailed block diagram for the Decoder/-Rate Buffer.

FIG. 32 is a detailed block diagram for the User Terminate Command Detector.

FIG. 33 is a detailed block diagram for the User Call Termination Controller, while FIG. 34 is the state diagram corresponding to FIG. 33.

FIG. 35 is a detailed block diagram for the Spacecraft Terminate Pattern Detector.

FIG. 36 is a detailed block diagram for the Spacecraft Terminate Memory.

FIG. 37 is a detailed block diagram for the Line Termination Memory.

FIG. 38 is a detailed block diagram for the Fine Sync Maintenance Reset Detector.

Each of these figures will now be described in detail.

DETAILED DESCRIPTION OF A PREFERRED EMBODIMENT

FIG. 1 shows a preferred embodiment of a fully variable, demand assignment, time division multiple access communication system having data terminals in accordance with the present invention.

The complete system comprises a processing repeater spacecraft 100, a number of ground data terminals 110, and various radio frequency communication links 121, 122 and 123. The system operates under the control of a processing repeater contained within spacecraft 100. This repeater handles both the assignment (on a demand basis) of time slots and overall system synchronization, in addition to reformatting bursts of wideband uplink communication data from the various terminals before they are retransmitted via the spacecraft's wideband downlink. For convenience, such a system is hereinafter referred to as a Spacecraft Synchronized Time Division Multiple Access ($S^2$TDMA) System.

The following detailed description of a $S^2$TDMA system and its various components assumes that the digital modulation technique employed is PCM 4-phase PSK and that the system requires a maximum capability of 400 two-way voice or data circuits in the spacecraft, each having a sample rate of 8000 8-bit PCM samples per second, 16 such samples being accumulated prior to transmission. However, depending on the particular requirements of the intended application, it will be obvious to those skilled in the digital communications art to employ other modulation techniques, (for example, delta modulation in 4-phase PSK), as well as other sample rates, resolution and number of channels. It should be noted that a particular data terminal need not be always "active" (currently transmitting wideband transmission bursts via one or more assigned channels); hence it is possible to have more terminals than channels.

COMMUNICATION LINKS

The $S^2$TDMA system utilizes the following types of communication links: 1) wideband downlink 121, 2) wideband uplink 122, and 3) narrowband uplink 123. The wideband links 121 and 122 are utilized primarily for the communication of voice and other data, whereas the narrowband uplink 123 is utilized to accomplish rapid initial coarse synchronization of a data terminal 110. Subsequent fine synchronization, as well as placing a call to another terminal, is accomplished through the wideband uplink on a non-interference basis with any assigned channel. The wideband downlink 121 includes a synchronization and control field, which is utilized by the spacecraft 100 to interrogate and call the data terminals in order to set up a circuit connection, to provide a time reference for uplink synchronization of the terminals, and to provide other control functions.

The uplink frame period is divided into a number of individually assignable time slots. The wideband uplink frame format, shown in FIG. 2*a*, consists of a composite of non-overlapping transmission bursts from the active data terminals in the system. The format is configured to contain 800 time slots, each time slot being employed for a single transmission burst. This corresponds to 400 two-way voice or data circuits comprising two adjacent time slots. Since the data sample rate is assumed to be 8000 samples per second and the number of accumulated data samples is assumed to be 16, the uplink frame period is 2000 microseconds (i.e., 16 × 125 microseconds). A time slot duration is therefore 2.5 microseconds (i.e., 2000 ÷ 800 microseconds). Each data transmission burst time slot, as shown in FIG. 2b, consists of a preamble 210 and 16 accumulated 8-bit PCM data samples 220. The number of bits employed for the preamble is 40. The call request portion 230 of the preamble is used to make a call request whenever a terminal 110 has one or more active channels and wishes to place another call. The preamble 210 also includes guard time 231 (required to maintain adequate separation between transmission bursts from different ground terminals 110), carrier acquisition time 232, bit acquisition time 233, and a unique word 234 used in the synchronization maintenance process and for determining the first bit of data. Since the data burst contains the equivalent of 168 bits and the time slot duration is 2.5 microseconds, the wideband uplink bit rate is 67.2 Mbps. Each fine sync code transmission burst, as shown in FIG. 2*c*, consists of guard times 240 and 241, carrier acquisition time 242, bit acquisition time 243, and fine sync code 244. The fine sync code transmission, which is required only during initial synchronization of a terminal, provides the spacecraft's processing repeater with the raw data for measuring the initial fine sync error. A 31-bit pseudo-noise (PN) sequence is chosen for the fine sync code 244. The spacecraft detection algorithm allows three bit errors in the code which, in conjunction with a code length of 31 bits, provides a theoretical false alarm rate of approximately one call in 39,200 and a miss rate of one call in 8,500, assuming a bit error probability of $1 \times 10^{118}$ $^{5}$. The 117-bit total guard time 240 and 241 allows a ± 0.85 microsecond tolerance for the coarse error measurement.

The wideband downlink format is a continuously transmitted PCM telemetry-like frame with a frame period of 2000 microseconds (i.e., the same as the wideband uplink frame period). A typical wideband downlink frame, shown in FIG. 3*a*, consists of a composite of 25 minor frames 350. Each minor frame 350, as shown in FIG. 3*b*, consists of a synchronization and control field 360 and a data field 365. The data field 365 consists of 32 one-way data channels 366 (or 16 two-way data channels). Each data channel 366 consists of 16 accumulated data words, each 8 bits of length. The data field 365 therefore consists of 512 data words or 4096 bits. The synchronization and control field 360, requires an additional 96 bits; hence, a minor frame 350 consists of 4192 bits; resulting in a downlink bit rate of 52.4 Mbps and a downlink efficiency of 4096:4192. The synchronization and control field 360 as shown in FIG. 3c consists of a minor frame sync code 370, minor frame number 380, terminal address 381, command word 382, and command magnitude 383. The minor frame sync code 370 is a unique word which is utilized by all terminals to obtain downlink minor frame synchronization. The minor frame number 380 identifies the particular minor frame 350 in the frame.

UPLINK SYNCHRONIZATION

Before a terminal can transmit voice or other data via the wideband uplink, it must be synchronized to the spacecraft downlink format to assure that its uplink transmission burst does not interfere with a transmission in an adjacent time slot. If the terminal is not currently active, it must be synchronized through the initial synchronization process. If it is active, synchronization is provided through the synchronization maintenance process.

Using the spacecraft 100 as a time reference, the beginning of each uplink frame is assumed to coincide with the beginning of each downlink frame. Thus, in order for a data terminal 110 to be synchronized to uplink transmissions from other terminals, it is sufficient for the terminal to synchronize itself to the spacecraft downlink format compensated for the one-way propagation delay from the data terminal 110 to the spacecraft 100. It should be noted that it is not necessary for the terminal to "know" the absolute link delay; it need known only the incremental delay required to make the link delay an integral number of frame periods. In the $S^2$TDMA system, this incremental delay is measured by the spacecraft's processing repeater. The computed result is transmitted to the ground terminal 110 via the spacecraft's downlink 121.

The INITIAL SYNCHRONIZATION process first utilizes the wideband downlink and the narrowband uplink to achieve coarse synchronization, then the wideband downlink and wideband uplink to achieve fine synchronization. After a particular terminal 110 detects, through the control field 360 of the downlink format, that it is being interrogated or called, the terminal desiring to place a call or being called responds with a coarse sync signal through the 100 kHz bandwidth narrowband uplink 123. The coarse sync signal format is shown in FIG. 4. The first 125 microseconds provides adequate time for narrowband uplink carrier acquisition, and the signal transition 400 provides timing information for the coarse synchronization measurement. The spacecraft's processing repeater detects the occurrence of the coarse synchronization signal transition 400 and measures the time interval between the transition occurrence and the next downlink start-of-frame (i.e., incremental coarse sync error measurement). The provision in the $S^2$TDMA system of a narrowband uplink 123 in addition to the wideband uplink 122 allows the terminal 110 to transmit at full power high signal-to-noise ratio through the narrowband uplink 123. Since the transmitter power at the terminal is such as to assure a wideband uplink ratio of energy per bit to one-sided noise spectral density ($E_b/N_o$) of +10 dB at the input to the spacecraft's 4-phase burst demodulator (to attain a bit error rate of approximately $10_{-}^{5}$), the signal-to-noise ratio of the 100 kHz bandwidth coarse sync signal transmitted at the same power level is approximately +38 dB at the input to the 2-phase burst demodulator. This relatively high signal-to-noise ratio assures the detection of the coarse sync signal with enough precision (3-sigma accuracy better than ±0.8 microseconds) to eliminate the need for a statistical averaging process. Having completed the measurement, the spacecraft's processing repeater provides the digitized coarse sync error measurement and an uplink time slot assignment to the terminal 110 through the control field 360 of the wideband downlink.

After it receives its coarse sync error measurement and assigned time slot, the terminal 110 transmits a fine sync code in its assigned time slot. The fine sync code burst format as shown in FIG. 2*c* includes a total guard time of 117 bits. Since the transmission of fine sync code requires approximately 0.76 microseconds and the time slot duration is 2.50 microseconds, the digitized coarse synchronization error measurement accuracy must actually be better than ±0.87 microseconds, in order that the fine sync code transmission not interfere with data transmissions from other terminals. The spacecraft's processing repeater detects the occurrence of the fine sync code within a window about the assigned time slot and measures the fine sync error. The fine sync error is determined within ±1 uplink bit times. The processing repeater then transmits the digitized fine sync error measurement to the terminal through the wideband downlink. Upon receipt of the fine sync error, the terminal is ready for wideband uplink communication with a synchronization accuracy of ±1 uplink bit time.

Once initial synchronization is achieved, the spacecraft must continue to perform a FINE SYNCHRONIZATION MAINTENANCE function for the terminal, since the link delay between the terminal 110 and the spacecraft 100 may vary with time because of spacecraft-terminal relative motion and other variable propagation effects. The terminal, once initially synchronized, continues to transmit in its assigned time slot (or time slots) for as long as it is "active". The spacecraft processor periodically monitors uplink transmissions in each assigned time slot, detects the burst synchronization unique word, and measures the fine sync error. The processor then periodically transmits the digitized fine sync error measurement to the relevant terminal 110 through the wideband downlink 121. The assigned time slots are monitored at a sufficient rate relative to the maximum rate of change of the link delay to assure a typical fine sync tolerance of less than ±2 uplink bit times.

DEMAND ASSIGNMENT OPERATION

The demand assignment operation consists of three phases: call request, call placement, and circuit release. In the CALL REQUEST phase, a terminal wishing to place a call is assigned a data channel. In the CALL PLACEMENT phase, the spacecraft processing relay calls the called terminal and assigns it a data channel, thus completing the two-way channel. In the CIRCUIT RELEASE phase, the previously active channels are returned to the pool of available channels.

The CALL REQUEST operation depends on whether the particular terminal already has an active channel or not, since an active terminal is already synchronized and the inactive terminal is not. The inactive terminal must wait for an interrogate command from the spacecraft before it can initiate its call request and receive initial synchronization. The active terminal need wait only for its next active uplink time slot to place its call request.

When an inactive data terminal receives a request to place a call from one of its incoming subscriber lines, the terminal temporarily stores the request and waits to be interrogated by the spacecraft through the wideband downlink. A terminal 110 is able to detect that it is being interrogated by recognizing its terminal address along with an interrogate command in the control field 360 of the wideband downlink format. When the terminal detects such an interrogate command, it responds with a coarse synchronization signal through the narrowband uplink 123. This initiates the initial synchronization process discussed previously. Since the spacecraft's processing relay sequentially interrogates each data terminal in the system, it can space the interrogations in time to assure that the narrowband uplink transmission bursts do not overlap. Upon receiving the relevant fine sync error measurement, the data terminal corrects its transmission burst position, thereby completing its initial synchronization and one-half of the two-way channel. The terminal then transmits a phone number (consisting at a minimum of the address of the other terminal and of the subscriber to which it wishes to be connected) in order to establish the second half of the channel.

When an active terminal receives a request to place a call from one of its subscriber lines, the data terminal temporarily stores the request and waits for one of its active uplink time slots. The data terminal then responds with a "Call Request" signal in the call request field 330 of its uplink burst format. Since the spacecraft normally monitors each uplink burst from each data terminal, it detects the call request, assigns a channel, and transmits the time slot assignment to the terminal. When the terminal receives its new time slot assignment, it transmits the address of the terminal and of the subscriber to which it wishes to be connected.

To complete the two-way channel (circuit) connection, the spacecraft must call the data terminal that has been addressed. This CALL PLACEMENT operation also depends on whether the called terminal has an active channel or not. The inactive terminal must wait for an "Initial Call" command from the spacecraft before the call placement process can be initiated, while an active terminal waits only for a "Supplemental Call" command and the subscriber address. When an inactive terminal receives such an initial call command, it responds with a coarse synchronization signal which initiates the initial synchronization process previously described. Once the called terminal is properly synchronized, and informed of its assigned time slot and the address of the subscriber being called, data communication may commence through the established circuit.

The maximum call setup time for the system occurs when making a circuit connection between two inactive terminals. The call setup time depends principally on two factors: 1) the maximum difference in link delay between any two terminals in the system and 2) the number of data terminals in the system. The maximum link delay difference affects the call setup time by limiting the interrogation and initial call rate of the system.

The CIRCUIT RELEASE operation frees the assigned channels for a new assignment. When a terminal detects a termination signal from an incoming subscriber line, it transmits a termination pattern in its assigned time slot. The spacecraft processor and the other terminal detect this termination pattern and proceed to free the relevant channels.

Thus it may be seen that a $S^2$TDMA system in accordance with the present invention permits any data terminal to complete a circuit to any other data terminal, the synchronization function for all terminals being under the central control of a processing repeater located onboard the spacecraft. Such a system, in the particular embodiment described, also optimizes the use of both terminal and spacecraft transmitters by permitting terminals to be in an "inactive" state wherein they are not regularly transmitting synchronization and data signals, by providing for a narrowband uplink (having a high signal-to-noise ratio) for the "Coarse Synchronization" signal from an "inactive" terminal, and by reformatting the wideband uplink transmission burst data into a continuous downlink of narrower bandwidth.

$S^2$TDMA SPACECRAFT PROCESSING REPEATER

The processing repeater included within spacecraft 100, is shown in block form in FIG. 5. It consists of the following components: receive antenna 500, uplink receiver 510, 4-phase burst demodulator/bit synchronizer 520, 2-phase burst demodulator 530, communication processor 540, 4-phase modulator 550, downlink transmitter 560, and transmit antenna 570. Functionally, it receives uplink data bursts from data terminals 110 in the system; translates them to intermediate frequency (IF) signals; demodulates these IF signals to baseband signals; processes and reformats the baseband signals, providing system control and a processed output signal; remodulates the processed signal onto an IF signal; translates this signal to an RF signal; and transmits this signal to all the data terminals in the system. The individual components will now be discussed.

The RF equipment includes the receiver 510 and the transmitter 560. The uplink receiver 510 accepts the receive antenna output, amplifies the received signal, and translates it to an intermediate frequency (IF). Its performance characteristics are typical of any receiver, having a bandwidth somewhat greater than the received signal rate frequency. The downlink transmitter 560 need satisfy no additional requirements beyond those normally imposed for handling a four-phase PSK IF signal input.

The IF equipment includes demodulators 520 and 530 as well as modulator 550. The four-phase demodulator/bit synchronizer 520 accepts the receiver IF output and provides a serial non-return to zero (NRZ) binary data stream as an output. The demodulator portion has the function of rapidly acquiring a coherent IF reference and coherently demodulating the in-phase and quadrature phase four-phase phase shift keyed (PSK) data to two baseband signals. The bit synchronizer must rapidly acquire bit timing which is synchronized to the two demodulator output baseband signals. This unit it typical of four-phase PSK demodulators used with conventional TDMA systems. Bit error rate versus required $E_b/N_o$ should be typically within 3db of theoretical.

The two-phase burst demodulator 530 is similar to, but simpler than the four-phase PSK demodulator 520. Acquisition requirements can be less rapid. Furthermore, no bit synchronization is required, but only a zero crossing detector.

The four-phase modulator 550 is a standard four-phase PSK modulator, having a continuous bit stream as its input and producing as an output two PSK signals, one on an IF which is in quadrature with the other. Its function is to split the input data stream into two bit streams, each at half the bit rate of the input stream. One of the two lower rate bit streams PSK modulates the IF reference; the second bit stream PSK modulates the IF reference after it is shifted by 90°.

Antennas 500 and 570 are conventional broadband spacecraft antennas having a gain pattern sufficient to receive from or transmit to all data terminals in the system.

The communication processor 540 performs the following principal functions: (1) converting the sequence of uplink transmission bursts into a continuous downlink PCM transmission format, inserting system control commands as required, (2) sequentially interrogating terminals for initial call requests, (3) providing inactive data terminals participating in a call with initial synchronization, (4) assigning time slots to data terminals upon demand, (5) maintaining synchronization of all active data terminals in the system, (6) providing initial call commands to all inactive terminals being called, (7) providing called subscriber addresses to called terminals, (8) accepting call requests from active terminals, (9) providing "all circuits busy" commands when all repeater time slots are full, and (10) initializing the system upon ground command or upon power turn-on.

A particular embodiment of a processing repeater suitable for use in an $S^2$TDMA system is described in detail in the application of Messrs. Schlosser and Reeves entitled "Processing Repeater for TDMA Communication System," filed on even data herewith and assigned to the same assignee.

A particular embodiment of a $S^2$TDMA data terminal will now be discussed in detail with reference to FIGS. 6–38 of the drawings. It should be noted that the application of the $S^2$TDMA concept need not be limited to a digital communication system having fixed ground stations and a satellite relay, but rather may find application to mobile ground, airborne, or space data terminals, while the processing relay itself need not be located on a spacecraft nor be airborne but may be in a fixed or mobile ground station, provided it can maintain reliable direct communication links to the various data terminals in the system.

$S^2$TDMA DATA TERMINAL

A typical $S^2$TDMA data terminal 110 is shown in FIG. 6. The data terminal receives and translates a continuous four-phase PSK signal to an intermediate frequency (IF) signal, demodulates the IF signal to a baseband signal, decommutates its assigned data channels, and digital to analog converts them for transmission to its subscriber lines. The terminal also accepts analog data from its subscriber lines, multiplexes and analog-to-digital converts them into digital data channels, four-phase modulates the data channels onto an IF signal for burst transmission, and translates and transmits the four-phase burst modulation signals. Rate buffering is necessary to convert the data sample bit rate to the uplink bit rate, to convert the downlink bit rate to the data sample bit rate, and for storing the 16 data samples of each active data channel.

In addition to its data transfer function, the data terminal must perform the following control functions: placing calls upon demand from the interface unit in response to spacecraft commands; receiving calls from other terminals in response to spacecraft commands; and accepting and executing control signals from, and providing control signals to, the user interface unit as part of the call placement and call request operations.

Data terminal 110 therefore comprises RF equipment, IF equipment, and digital equipment. The RF equipment includes a transmit/receive antenna 610, an uplink transmitter 620, and a downlink receiver 621. The IF equipment includes a four/two-phase burst modulator 630 and a four-phase PSK demodulator/bit synchronizer 631. The digital equipment operates under the control of terminal controller 640 and includes a frame synchronizer 650, an uplink formatter 660, downlink rate buffer 670, and associated decoder 671, as well as uplink rate buffer 680 and its associated decoder 681. The data terminal also includes a user interface unit 690 for interfacing with subscriber lines 691.

Uplink transmitter 620 transmits bursts of data in the same manner as the ground terminal transmitter in a conventional TDMA system. Its input is provided by the four/two-phase PSK burst modulator 630 output signal, which is translated to the transmit frequency, amplified and sent to antenna 610.

Downlink receiver 621 receives a continuous four phase PSK signal from the terminal antenna 610, amplifies this signal and translates it to an IF which is output to four phase modulator 631. It is similar in functional requirements to ground terminal receivers for a conventional TDMA system (and $S^2$TDMA spacecraft receiver 510), except that the received signal is continuous rather than in burst format.

Four/two-phase burst modulator 630 in its four-phase portion is functionally similar to the spacecraft four-phase PSK modulator 550 except for the additional requirement to operate in a burst mode, which is typical of conventional TDMA systems modulators. The two-phase mode for the modulator is readily provided by disconnecting one of the two-phase modulators from the four-phase modulator output.

Four-phase PSK demodulator/bit synchronizer 631 is basically a standard four-phase PSK demodulator and bit synchronizer. Its input and output signals differ from those for the spacecraft demodulator bit synchronizer 520 in that they are continuous, i.e., not in bursts. The continuous signal simplifies the demodulator/bit synchronizer, as compared to the spacecraft unit, since neither acquisition of the IF or bit timing must be rapid.

The digital equipment portion of the data terminal 110 comprising controller 640, synchronizer 650, formatter 660, downlink rate buffer 670 and decoder 671 and uplink rate buffer 680 and encoder 681 is shown in functional block diagram form in FIGS. 7A and 7B, and will now be described with respect to that figure.

This equipment is required to perform the following functions: multiplexing, encoding, and rate buffering active voice circuits from users interface unit 690; formatting uplink data bursts; downlink frame synchronizing, decommutating, and rate buffering active data channels from frame synchronizer 650; decoding and demultiplexing voice circuit data from rate buffer 670 to user interface unit 690; accepting, decoding, and executing spacecraft commands to place calls upon demand from the interface unit; accepting, decoding, and executing spacecraft commands to receive calls from other terminals; and accepting and executing control signals from, and providing control signals to, the user interface unit 690 as part of the control placement operation. Accordingly, the digital equipment consists of six types of functional blocks: timing, code detectors; encoders, decoders and formatters; synchronization processors; controllers; and memories.

The TIMING blocks consist of downlink timing 710, uplink timing 711, and reference timing 712. The downlink and uplink timing 710 and 711 provide the timing to demultiplex and multiplex the downlink and uplink data transmissions, respectively. Reference timing 712 is similar to the uplink timing and is used as a reference for uplink synchronization and a general timing source.

The CODE DETECTORS include the following circuits in addition to frame synchronizer 650: terminal address detector 722, command decoder 723; ring pattern detector 724; spacecraft terminate pattern decoder 725; user call request detector 726; user terminate command detector 727; and fine sync maintenance reset detector 728.

The ENCODER, DECODER and FORMATTER circuits include the following: encoder/rate buffer 731, decoder/rate buffer 732; uplink formatter 733; and coarse sync generator 734.

The SYNCHRONIZATION PROCESSOR consists of only the uplink sync correction logic 741.

The CONTROLLERS include the folling: call placement controller 751; user call mode controller 752; spacecraft call mode controller 753; initial synchronization controller 754; and user call termination controller 855.

The MEMORY CIRCUITS include the following: spacecraft call request memory 761; spacecraft terminate memory 762; downlink data circuit memory 763; uplink data circuit memory 764; and line termination memory 765.

Each of the functional blocks comprising the data terminal digital equipment will now be described in sufficient detail to enable one skilled in the digital communication arts to practice the present invention.

The frame synchronizer 650 performs functionally like a conventional frame synchronizer for telementry data. Its input is NRZ data, provided by the four-phase PSK demodulator/bit synchronizer 631. The data has been formatted in the spacecraft, each minor frame of data being preceded by a minor frame synchronization code word 370. The frame synchronizer searches for, and locks to this code, thereby permitting (in conjunction with minor frame number 380) the identification of the position of all data in the frame and the demultiplexing of the data to the proper circuit. The data terminal requires that frame synchronizer 721 provide major frame sync, minor frame sync and that the serial NRZ data bit stream be properly phased to these sync signals.

The downlink timing circuit 710 is used by the digital equipment to perform the following functions: decoding spacecraft commands; decommutating downlink data channels; and decoding terminate patterns and ring patterns occurring during downlink data channel times.

The downlink timing logic, shown in block diagram form in FIG. 8, is synchronized by the major frame sync and the minor frame sync pulses from frame synchronizer 650. The major frame sync pulse is used as the "Downlink Start of Frame" pulse and to synchronize the downlink minor frame timing 810. The minor frame sync pulse is used to synchronize the bit timing 820 and control field timing 830 circuits.

The bit timing circuit 820 includes a divide by 8 bit counter and provides the bit timing word clocks to the control field and data word timing circuits.

The control field timing circuit 830 includes a divide by 13 word counter and is used to determine the synchronization and control field 360 period of the downlink minor frames 350. In addition to providing read pulses used in the decoding of the control field words (i.e., terminal address, command word, and command magnitude), this circuit provides a Reset pulse and the Data Transfer Enable signal. The reset pulse occurs during the first bit of the channel data period. This pulse resets both the data word and data channel timing circuits 840 and 841. The Data Transfer Enable signal is an envelope occurring during the channel data time. The data word timing circuit 840 includes a divide by 16 word counter used to count the channel word occurrences and to clock data channel timing circuit 841. Circuit 841 includes a divide by 32 counter used to count the 32 data channels occurring every minor frame.

Minor frame timing circuit 810 includes a divide by 25 counter used to count the 25 minor frames in the downlink frame.

The data channel 841 and minor frame 810 timing counters are decoded to provide the channel number (1-800).

The data terminal address detector 722, shown in block diagram form in FIG. 9, detects the occurrence of the data terminal address of the particular data terminal and enables the decoding of the command word and the command word magnitude being transmitted to it by the spacecraft.

The downlink parallel bit stream from the data register 900 is decoded by terminal address decoder 910. Whenever the data terminal address of the particular data terminal 110 is detected at read terminal address time (as indicated by the downlink control field timing 830), the terminal address detected latch 920 is set. The latch is then reset following read command word magnitude time as designated by the downlink control field timing 830.

The command decoder 723, shown in block diagram form in FIG. 10, decodes downlink commands by means of decoder 1000 and temporarily stores command magnitude data in register 1010 when the particular data terminal is addressed, as determined by terminal address decoder 722. The commands include interrogate, initial call, supplemental call, time slot assignment, coarse sync (C.S.) measurement, fine sync (F.S.) measurement, fine sync maintenance (F.S.M.) measurement and subscriber address. The command magnitude data includes: coarse sync error measurement (C.S.M.); fine sync error measurement (F.S.M.); time slot number (T.S.N.); subscriber address (S.A.); and fine sync maintenance error measurement (F.S.M.M.). Decoded commands are stored in the output register 1020 until these are cleared by the using circuitry.

User call request detector 755 is shown in block diagram in FIG. 11. Serial to parallel register 1110 stores serial data from user interface unit 690. The format of the data stored in register 1110 is shown in FIG. 12. Phone number assignment register 1120 is used to store and serially output the phone number to uplink formatter 733. If a terminal user places a call request, interface unit 690 transmits a logical one in the call bit position and a logical zero in the circuit assignment bit position followed by the voice circuit number and the phone number. If the terminal requests a voice circuit line assignment from the interface unit (after a spacecraft call is received), the interface unit transmits a zero in the call bit position and one in the circuit assignment bit position. These bits are followed by zeros or a convenient bit pattern in the voice circuit number and the actual number bits.

The call placement controller 751 is shown in block diagram form in FIG. 13. It performs the following functions: enabling the uplink synchronization of the terminal and controlling the terminal operation during the placement of user calls and placement of spacecraft calls. Its state diagram is shown in FIG. 14. When in the wait for call mode 1400, the controller 1300 enables the placement of user call requests by the interface unit 690, waits for spacecraft call commands, and searches the spacecraft (SC) call request memory 761 for stored SC call requests. If a call request is detected, interface unit 690 is inhibited from placing a call request (or another call request if it is the source of the detected call) until the detected call is placed. If simultaneous user and SC calls are detected, controller 1300 will initiate the SC call and transmit a Repeat User Call signal to interface unit 690 along with disabling the User Call Request Enable signal. In this case the interface unit waits until its is enabled and repeats the call request if the user is still waiting.

If, while in the wait for call mode 1400, the terminal receives a user call request or an initial SC call, the controller will proceed to the set user call latch or to the set SC call latch modes 1410 and 1420, respectively. The setting of call latches 1310 allows the controller to retain the call mode status (i.e., user call or SC call) until the call is placed.

If the controller has completed the set user call latch operation 1410, and Fine Sync Maintenance is disabled (indicating that the terminal must obtain initial synchronization), the controller goes to the initial synchronization mode 1430 which enables initial synchronization controller 754. When initial synchronization is completed, controller 1300 enables the fine sync maintenance function of the uplink sync correction logic 741 and goes into user call mode 1440, which enables the user call mode controller 752. If, on the other hand, the user call latch is set and Fine Sync Maintenance is enabled, the controller goes to the transmit call request and wait for time slot mode 1450. While in this mode, controller 1300 transmits wideband call requests to the spacecraft on an uplink time slots already in use by the terminal. The wideband call request is transmitted until a time slot assignment is received. The controller will known within two uplink frame periods if there are no time slots in use by the terminal (for placing the wideband call request) and will, in that case, go to the initial synchronization mode 1430. The controller waits for a time slot assignment from the spacecraft. When the time slot is assigned and initial fine sync is acquired, the controller goes to the user call mode 1400. Note that if while waiting for a time slot in which to transmit a wideband call request the available time slots cease to exist, the controller will then go to the initial synchronization mode 1430 within two uplink frame periods. Also, while the controller is in the transmit call request and wait for time slot mode 1450, the spacecraft processing repeater can transmit and "all circuits busy" command to the terminal. The controller will then terminate the call placement and transmit a circuits busy signal to the interface unit 690. The circuits busy signal is a signal dedicated to the user call request function.

If the controller enters the initial synchronization mode, it waits until the uplink synchronization is complete and then goes to the proper call mode (user call mode 1440 or SC call mode 1460). If while in the initial synchronization mode 1430, the fine sync measurement is not received from the spacecraft, the controller goes back to the wait for call mode 1400. In this event, if the user latch is set, the controller transmits a (SC) circuit busy signal to the interface unit and resets the user latch. If the SC call latch is set instead, the controller resets this latch only and waits for the next call.

If a supplemental call command is received from the spacecraft, while the controller is in the wait for call mode 1400, the wait for time slot mode 1470 is entered. When a time slot assignment has been received, the controller enters the SC call mode 1460.

When the user call mode 1440 or the SC call mode 1460 is complete, the controller goes to the enable SC call request search mode 1480. In this mode, the SC call request memory 761 is searched for SC supplemental calls that may have been received while the controller was in the user or SC call modes 1440 or 1460. If an SC supplemental call is stored in the memory,, the controller will first reset the call latches 1310 and then go to the SC call mode 1460. If there are no SC supplemental calls stored, the controller will go back to the wait for call mode 1400. The premature termination of a call mode will also cause the controller to to to wait for call mode 1400. Once back in that mode, the controller again enables the interface unit 691 to place user call requests and continues to wait for SC calls.

Call placement controller 751 also provides the uplink encode and downlink decode envelopes which are used during the call placement modes. These envelopes are call placement enable signals. The Uplink Encode Enable signal from comparator 1310 is used to transmit fine sync codes, wideband call requests, phone numbers, ring patterns, and terminate patterns to the spacecraft during assigned time slots. The Downlink Decode Enable signal from comparator 1320 is used to detect ring patterns and termination patterns on the assigned downlink channel during call placements. Both signals are used to program the data circuit memories when the called parties answer.

The initial synchronization controller 754, shown in block diagram form in FIG. 15, is used to initially synchronize the data terminal's uplink timing to that established by the spacecraft's processing repeater. The controller performs the following functions: enabling the transmission of the narrowband coarse sync signal to the spacecraft, enabling the transmission of the fine sync codes, and enabling the uplink sync correction logic to operate on the coarse sync measurement and the initial fine sync measurement to update the uplink timing synchronization.

The operation of controller 754 is defined in the state diagram in FIG. 16. The SC call interrogate signal or initial call command enables the controller to the coarse sync signal transmission enable mode. Transmission of the coarse sync signal places the controller in the wait for coarse sync measurement mode. When the coarse sync error measurement is received, the controller proceeds to the coarse sync measurement update mode and waits for a time slot assignment. When the coarse sync measurement update is complete and the assigned time slot is received, the controller is enabled to proceed to the fine sync transmission mode. When the controller attains the fine sync transmission mode, it remains in this mode until the fine sync error measurement is received. The terminal transmits fine sync codes in its assigned time slot every major frame while in this mode. Receipt of the fine sync measurement places the initial synchronization controller in the fine sync update mode. This mode ends when initial synchronization is achieved (the uplink sync correction logic fine has synchronized the uplink timing with the fine sync measurement).

At the beginning of the fine sync code transmission mode, a counter may be enabled for determining how long the coarse sync measurement is to be considered valid, based upon the spacecraft range and range rate data. If the fine sync measurement is not received before this counter times out, the controller may then transmit a Terminate Call Placement command to the call placement controller 751. Initial synchronization controller 754 is then disabled until the detection of the next initial call.

The coarse sync generator circuit 734, shown in block diagram form in FIG. 17, is used to generate the coarse sync signal and to control the two-phase narrowband modulator. Control logic 1710 insures that the coarse sync signal is transmitted at the first window available about the reference timing start of frame. The coarse sync signal transition 400 is positioned by coarse sync logic 1720 at the beginning of the reference timing start of frame. The coarse signal is transmitted starting at the beginning of the 751st time slot which is 125 microseconds before start of frame and terminated at the beginning of the 51st time slot which is 125 microseconds after start of frame.

The reference timing circuit 712, shown in block diagram form in FIG. 18, provides timing for the following terminal functions: communication from data terminal to interface unit; terminal command processing; termianl control; coarse sync signal generation and transmission; and uplink synchronization correction and maintenance.

The reference timing frame length is identical to that of the spacecraft (FIGS. *2a* and *3a*). The coarse sync signal transition 400 is positioned at the reference timing start of frame. The bit timing circuit 1810 is clocked by the 67.2 mbps clock 1820 which is also used as the bit clock for the uplink timing chain. Bit timing circuit 1810 includes a 168 state bit counter and is used to clock slot timing circuit 1830. The slot timing includes and 800 state counter. The start of frame decoder 1840 provides a bit time pulse occuring at the start of reference timing frame.

The uplink sync correction logic 741, shown in FIG. 19, accepts the coarse sync error measurement, the fine sync error measurement and fine sync error maintenance measurements and uses these to position the synchronization of the uplink timing with respect to the data terminal's reference timing. Initial synchronization is achieved using the coarse sync and fine sync measurements. Synchronization is maintained using the sync error maintenance measurements.

The initial synchronization controller 754 enables the initial uplink synchronization correction mode. At the beginning of this mode, the correction logic controller 1900 is enabled to accept the coarse sync measurement number which is expressed in units of slot times and uplink bit times. To allow for subsequent possible negative fine sync errors and fine sync error maintenance corrections, the coarse sync error measurement number, when received, is biased by minus 1 slots number biasing logic 1910 and by plus 168 uplink bit times in bit number biasing logic 1915. If, for example, the coarse sync measurement received equals 0 slots + X bits, the measurement is changed to be 799 slots + (X+ 168) bits.

The coarse sync measurement is then loaded into the biased memories 1920 and 1925 which store the measurement as a reference number to be corrected with subsequent measurements. In addition, the bit number is loaded into the bit number memory 1940. The biased slot number portion of the measurement is loaded into a down counter 1950 at the sart of the reference timing frame. The zero state of the counter is decoded and used to enable the loading of the biased bit number of the measurement into the bit decoder down counter 1960. The zero state of this counter is decoded and used by sync generator 1970 to generate the uplink frame sync.

The fine sync measurement, which can range from a minus 64 uplink bit times to a plus 64 uplink bit times is used to correct the biased coarse sync error bit number. The magnitude of the fine sync error measurement is used by clock control circuit 1980 to determine the number of clock pulses into the up/down coarse sync error bit number correction counter 1985. The sign of the measurement is used to control the up/down mode of the counter. The output of the coarse sync bit number correction logic represents the updated biased bit number measurement and is gated via OR gating 1990 into the bit number memory 1940 where it is stored. The slot decoder 1950 is again loaded, resulting in the loading of the bit decoder down counter 1960 at the same reference timing slot number previously established. The bit decoder, however, now counts down the corrected biased bit number and enables the generation of the updated uplink frame sync. All down counters remain in the zero until they are loaded again so that the sync signal is generated only once as a result of each measurement.

The fine sync error maintenance measurement ranges over −2 to −2 bit times and used identically to the fine sync error measurement to update the uplink sync during the maintenance mode. Fine sync maintenance is enabled by the call placement controller 751 and the intial synchronization controller 754.

The uplink timing circuit, shown in block diagram form in FIG. 20, is used to encode and format the wideband uplink frame. The uplink timing chain is identical to the references timing chain with the exception that it is synchronized periodically by the uplink sync signal. The bit timing circuit 2010 contains a 168 state counter and is decoded to provide the bit times required to format the uplink data bursts. The slot circuit 2020 contains and 800 state counter. The start of frame decoder 2030 is used to provide the uplink start of frame pulse.

The uplink formatter 733, shown in block diagram form in FIG. 21, formats uplink data burst transmissions and enables the four-phase modulator during the burst occurrences. It inserts the following in the uplink burst transmission as required: fine sync code;
phone number; ring pattern; termination pattern; and voice data.

The formatter circuit includes the code and pattern generators 2110, 2120, 2130, 2140, 2150, and 2160, as shown in the block diagram. The Fine Sync Code Burst is positioned in the middle of the uplink time slot (FIG. 2*c*). The controller 2100 controls the insertion of the carrier, the bit acquisition and the Fine Sync Code when enabled by the intial synchronization controller and by the uplink encode enable No. 2 envelope which is generated by the call placement controller during the assigned time slot. The carrier acquisition, the bit acquisition, the unique word and the call request bits are inserted into the preamble portion of the data burst. Data bursts are all positioned with the 6 bit guard time preceding the burst (FIG. 2*b*). The phone number, the ring pattern words, and the termination pattern words are positioned in the data sample times of the burst. The uplink encode enable No. 1 signal is used to transmit active call data bursts. Formatter control 2100 provides the Data Transmit Enable signal to the encoder/-rate buffer 731 during these times slots to enable the clocking of the serial data bit stream to the formatter. This envelope is 128 bits long and is positioned after the preamble codes.

The output gating and buffer 2170 multiplexes the codes in the proper format to modulator 630.

The user call mode controller 752 is used to complete terminal user call requests. The input/output signals of the controller are shown in the block diagram of FIG. 22.

The operation of controller 752 is defined in the state diagram in FIG. 23. The controller is enabled by a signal from the call placement controller 751. The controller first enables the transmission of the phone number to the spacecraft. The controller next enables the transmission of the ring pattern to the spacecraft and enables the detection of the ring pattern in the downlink channel. The ring pattern is transmitted to the spacecraft to allow the spacecraft to perform fine sync maintenance measurements. The detection of the ring pattern on the downlink data indicates that the called subscriber line is not busy and that his phone is ringing. The detection of the end of the ring pattern on the downlink indicates that the called subscriber has answered his phone. If the called party answers (i.e., the downlink ring pattern transmission ceases), the controller enables the decoding of voice on the downlink data. The uplink ring pattern transmission is ended and the encoding of voice is enabled. The controller then goes to the Wait For Call Mode Enable state.

If the termination pattern is detected before the ring pattern is detected on the downlink data, the controller transmits a line busy signal to the interface unit and terminates the call (i.e., goes back to the Wait for User Call Mode Enable state). If a user terminate command is detected after the ring pattern is detected on the downlink data (or before the ring pattern transmission has ended), the controller transmits a termination pattern to the spacecraft and terminates the call.

Ring pattern detector 724 is shown in block diagram form in FIG. 24. The ring pattern detection gating 2410 searches for ring pattern word occurrences in the downlink asigned time slot for the call placement in progress. The ring pattern is a sequence of 8 bit ring codes and occurs during the data portion of the time slot. Gating 2410 is enabled during the placement of user call requests. Ring pattern detector 724 outputs two signals: 1) ring detected, which indicates that the user at the called terminal is being rung (not busy) and 2) the ring terminated signals, which indicates that the called party has answered his telephone.

The event counter 2420 is used to count a specific number of consecutive occurrences or non-occurrences of the ring code in the assigned downlink channel. When ring detecting gating 2410 is first enabled, the counter 2420 is used to count consecutive code occurrences. Any non-occurrence of the ring code resets the counter. If the counter counts the required number of consecutive codes, the ring detected latch is set in memory 2430, and the counter is then used to count a specific number of consecutive misses. During this mode any ring code occurrence resets the counter. If the required number of consecutive misses are counted, Ring Terminated is set and Ring Detected is reset. The user call mode controller resets Ring Terminated, and disables the ring pattern detector when the call is placed.

The spacecraft call request memory circuit, shown in block diagram form in FIG. 25, is used to store consecutively received spacecraft call requests. The memory allows the terminal to place several consecutive calls, one at a time, by storing the time slot assignment and subscriber address for each call request.

The storage control logic 2510 clocks an M state counter 2515 after a call has been received and stored. Each state of the counter enables the selection of the corresponding *n* bit storage latch 2525. When a call request is first received and stored in the input n bit latch 2517, the steering logic 2520 stores the call request data in the n bit latch 2525 selected by the present state of counter 2515. The storage control logic then selects the next n bit latch 2525 by clocking the counter 2515 once for the next call request to be received.

One of the n bits is designated the "call bit" and is used to indicate an active call request.

If the call placement controller 751 is in the Wait For Call or in the Spacecraft Call Search mode, the n-bit call request storage latches 2525 are searched continuously for calls. If a call request has been stored, the first call bit detected in output latch 2550 inhibits the search process of call search logic 2540 and flags a spacecraft call request. The call placement controller then proceeds to the appropriate mode. If a call is placed, the SC call mode controller 753 clears the storage latch call bit with a Call Placed signal. This causes logic 2540 to output a clear pulse to clear logic 2555, which then clears the call bit of the n-bit latch selected by counter 2542. If a call placement is in progress and terminated before it is placed, the call bit is also cleared.

The terminal will normally process all call requests before memory 761 is full. The call placement controller 751 processes spacecraft call request until it has processed all stored call requests. The call placement controller then enables the interface unit to place call requests.

The spacecraft call mode controller 753 is used to complete spacecraft calls. The input/output signals of the controller are shown in the block diagram of FIG. 26.

The operation of the controller 2600 is defined in the state diagram of FIG. 27. When the controller is enabled by call placement controller 751 by the Spacecraft Call Mode enable signal, the controller waits for the subscriber address transmission from the spacecraft. When the subscriber address is received, the controller transmits it to the interface unit via shift register 2610 as part of a call request. The controller then waits for a voice circuit line assignment from the interface unit (a voice circuit will be assigned if the user line is not busy). If a voicee circuit is assigned, the terminal will transmit the ring pattern to the spacecraft and wait for the called party to answer his phone. If the phone is answered, the controller enables the decoding of voice from the downlink data on the assigned channel. The ring pattern transmission to the spacecraft is then terminated and the encoding of and transmission of voice is begun.

If a voice circuit is not assigned, indicating a busy line, the controller enables the transmission of the termination pattern to the spacecraft. It then completes the termination of the call by disabling the decoding and encoding of data on the channel and time slot assigned.

If the terminal detects a termination pattern on the assigned channel before the call party answers, the controller will transmit a terminate call command to the interface unit and go to the wait for SC Call Mode Enable state.

The Uplink Data Circuit Memory 764 is used to enable the uplink data burst transmission of an active call on a particular voice circuit line number during the relevant time slot of the uplink frame. The data circuit memory, shown in FIG. 28, is a random access memory 2800 addressed with the uplink time slot number. The data inut to the memory (also designated "RAM NO. 1") includes the voice circuit line number from user call request detector 726 and a call bit (stored in latch 2805) which are stored in the address of memory 2800 designated by the assigned time slot. The voice line number output from the memory is used to select the particular data register in the encoder/rate buffer which stores the encoded voice data to be transmitted. The call bit, which is also read out of the memory, is used to enable the uplink formatting of data at the uplink formatter. When a call is terminated, it is therefore sufficient to clear only the call bit.

The RAM is programmed during call placements by the call mode controllers 752 and 753 and is cleared during the termination of active calls by the user call termination controller 755 or the SC terminate memory 762.

The Data Circuit Program Enable signals allow the memory to be programmed during the beginning of the next uplink slot time. The RAM write pulses generator 2810 decodes the Call Placement (C.P.) pulse, the Call Terminate (C.T.) Write pulse and the 6 Bit Enable envelope. The write pulses occur at different bit times within the first 6 guards bits of the time slots. The 6 Bit Enable envelope occurs within this guard time. When either Data Circuit Program Enable signal is true, the encode control logic 2820 gates the C.P. Write pulse which sets the call bit, controls the OR gating 2830 to address the memory with the address stored in the call placement latch and enables the writing of the voice circuit number into memory. The memory is normally addressed with the slot number from the uplink timing when the 6 Bit Enable envelope is low. The memory call bit is cleared by the Uplink Data Clear No. 1 signal which occurs during the assigned time slot. This signal occurs as a result of a terminal user call termination command. The memory is also cleared (as a result of the detection of the call termination patterns on the corresponding downlink channel) by the Uplink Data Call Clear NO. 2 signal.

The Downlink Data Circuit Memory, shown in block diagram form in FIG. 29, is used to provide the voice circuit line number for demultiplexing the downlink data during the channel times assigned to active calls being processed by the terminal.

The memory 2900 is used in a similar manner to the uplink memory and is also a random access memory.

The assigned voice circuit line number and an active call bit (via latch 2905) are written into the memory when it is addressed with the assigned channel number.

The control logic 2910 accepts the Enable signals and the Call Write (or Call Clear) pulse which occur during the assigned channel time and generates one Call (or Clear) signal which occurs during the assigned channel time to program (or clear) the call. The Terminate pulse which occurs as a result of the detection of the spacecraft termination pattern in the downlink data, also clears the memory by clearing the call bit.

The encoder/rate buffer circuits are shown in block diagram form in FIG. 30. Under the control of encoder and data storage timing circuit 3010, the encoder portion accepts analog voice data from 64 voice circuits via analog multiplexer 3035, performs analog to digital conversions on each circuit by means of sample and hold circuit 3040, controller 3030, and analog to digital (A/D) converter 3045 and outputs the digitized data via parallel in/serial out shift register 3050 to the rate buffer portion. The rate buffer portion takes the digitized data and stores it in the appropriate buffer 3025 according to voice circuit number. The voice circuit data are then read out during the time slot assigned to the call using the voice circuit.

Timing is provided by the encoder and data storage timing circuit 3010. This circuit includes a 512 kHz oscillator and clock circuit and a 64 state counter. This timing is synchronized to the uplink start of frame. The 64 state counter cycles 16 times per uplink frametime. During one 512 kHz clock period, a voice circuit is sampled, the sample is encoded into an 8 bit digital word, and the 8 bit word is clocked into the serial-in/parallel out shift register 3020 of the selected voice circuit 3025.

The encoder control 3030 multiplexes the analog voice circuit data, samples each circuit at a rate of 8,000 samples per second (or 16 times per uplink frame time) and loads the digitized words into the encoder output parallel-in serial-out shift register 3050.

Each word is clocked out of register 3050 serially and the serial bit stream is decommutated into 64 voice circuits in the order of encoding. Each 8-bit word is clocked into the 128 bit (16 word) serial-in/parallel out shift register 3020 dedicated to the associated voice circuit. At the end of the uplink frame when these registers are filled, the stored data are loaded into the 128 bit parallel-in/serial out shift registers 3055.

When a voice circuit is being used for an active call, the uplink data circuit memory (RAM NO. 1) output is used by digital multiplexer 3050 to select the serial-out shift register 1355 storing the voice data. Data read timing 1360 then clocks out the stored voice circuit data during the time slot assigned to the call, by gating the uplink clock (67.2 mbps) to the data circuit selected by the output of RAM No. 1. The Data Transmit enable signal from uplink formatter 733 is used to enable the clock during the data time of the uplink data burst format. At the same time, RAM No. 1 and the Data Transmit Enable signal control the output digital multiplexer 3050.

The decoder/rate buffer circuit 732 is shown in block diagram form in FIG. 31. The rate buffer portion accepts serial data demultiplexed from the downlink frame and stores the data in registers dedicated to the interface unit voice circuit assigned for the call. The contents of these registers are outputed one word at a time to the decoder portion. The decoder performs digital to analog conversions on each work and demultiplexes its output to the selected voice circuits, as specified by downlink data circuit memory 763 (RAM No. 2).

The decoder/rate buffer circuit reproduces the received sample voice digital into an analog output. The decoded samples occur at a rate of 8,000 samples/sec (or 16 times per downlink frame time). The timing is provided by the decoder and data read timing circuit 3110 which includes a 512 kHz oscillator-clock source and a 64 state counter, as in the encoder/rate buffer circuit 731. The timing is synchronized to the downlink start of frame.

The data storage logic 3120 enables a 128 bit 52.4 mbps clock burst to the voice circuit serial-in/parallel-out shift register 3130 selected by the downlink data circuit memory 763 output. (This clock burst occurs during the downlink channel assigned to the call using the selected voice circuit.) The downlink data serial bit stream is provided by the data distribution logic 3140. At the end of every downlink frame time the contents of the serial-in/parallel-out shift registers 3130 are transferred to the parallel-in/serial-out shift registers 3150.

During one 512 kHz clock period, an 8 bit word from one of the parallel-in/serial-out shift registers 3150 is decoded to analog data, and demultiplexed to the assigned voice circuit. In addition, the selected voice circuit serial-out shift register 3150 is given an 8 bit clock burst after converter 3180 has terminated the conversion to set up the conversion of the next stored word when the same register is next selected. The decoder control circuit 3170 enables the D/A converter 3180 and the output analog demultiplexer 3190 during each state of the 64 state counter in timing circuit 3110. In addition, circuit 3170 detects the conversion complete output signal of the converter.

The user terminate command detector 727, shown in block diagram form in FIG. 32, is used to accept user call termination commands. The interface unit 690 responds to user terminate commands during call placements or active calls by providing detector 727 with the voice circuit number to be terminated.

The circuit consists of a serial-in/parallel shift register 3210. The register accepts the voice circuit line number to be terminated and an active user termination command bit. The command register is used to store the command until the terminal has processed it, at which time the command bit is cleared and the interface unit is enabled to place the next command.

The user termination controller 755 is used to terminate active calls upon command by the terminal interface unit 690. The block diagram of the controller is shown in FIG. 33.

The operation of the controller 3300 is defined in the state diagram in FIG. 34. When a user terminate command is detected, the controller compares, by means of comparator 3310, the output of the downlink data circuit memory 763 with the voice circuit line number stored in the user termination command detector 727. If the call is found active, the controller transmits a termination pattern to the spacecraft on the time slot assigned to the call. At the same time, the uplink data circuit memory is cleared. The downlink data circuit memory 764 and the user terminate command register 3210 are then cleared.

If the call is found not to be active after reading the complete output of the data circuit memory for one downlink frame time, the controller returns to the wait for terminate command mode and transmits a terminate user call signal to user call mode controller 752. This signal causes the user call mode controller to terminate the call being placed.

Digital comparator number 1 (3310), as shown in FIG. 33, is used to compare the output of the downlink data circuit memory 763 with the voice circuit line member stored in the user call termination detector register 3210. If the call is found to be active, the channel number is stored in both latch number 1 (3320) and latch number 2 (3330) during the time the comparison is true. (Latch number 1 has the least significant bit inverted to allow for valid channel and slot time pairs).

The controller then enables digital comparator No. 2 (3340) for one full uplink frame time beginning at the start of frame. The resultant comparison envelope is used in the uplink formatter 733 along with Terminate Pattern Enables number 2 to transmit a termination pattern to the spacecraft during the stored slot number. At the same time, this envelope is used to clear the associated call bit in the uplink data circuit memory 764. The controller then uses the output of comparator number 3 (3350) and the Downlink Data Program Enable signal to clear the downlink data circuit memory 763 call bit during the channel time stored in latch number 2. The user call termination register 3210 is also cleared at this time by the controller. It might be noted that during call placements, this register is cleared by the call mode controllers 752 and 753.

The spacecraft terminate pattern detector 725, shown in block diagram form in FIG. 35, is used to detect the termination pattern on downlink channels being used by the data terminal.

Decoder 3510 is enabled by the signals used in the terminal to decode downlink data; the Data Decode Enable numbers 1 and 2 and the Data Transfer Enable signal. When enabled, input decoder 3510 detects the occurrence and non-occurrence of the terminate pattern words. The events counter 3520 is used to count a specific number of consecutive terminate pattern word occurrences in the particular channel time. If the required number are counted, the mode memory 3530 is set and its output inhibits (by means of gating 3540) the gated control signals to the counter (Clock and Reset 1). Memory 3530 output remains high intil the start of the next channel time, when the memory and the counter are reset. During the count of consecutive terminate pattern word occurrences, any non-occurrence of the pattern resets the events counter.

The spacecraft (SC) terminate memory 762, shown in block diagram form in FIG. 36, is used for: temporarily storing the uplink slot number of the call to be terminated, generating the clear enable signal (Uplink Data Call Clear No. 2) for the uplink data circuit memory (RAM No. 1), and detecting and storing the occurrence of a SC terminate pattern on a downlink channel in use by a call placement in progress. Since call termination patterns can occur on two adjacent downlink channels for two different calls, the SC terminate memory must store the channel number of both occurrences in sequence. While the channel number of the second occurrence is being stored, the channel number of the first occurrence is gated out (via OR gating 3610) to the uplink data circuit memory 764 (RAM No. 1). Uplink Data Call Clear No. 2 signal enables the clearing of memory 764 by the very next Call Terminate Write pulse (generated in the memory circuit during the data guard time of the next uplink burst transmission). The channel counter least significant bit (LSB) toggles at channel rate and is used to control the alternate storing and gating out of the stored channel numbers by storage registers A and B (3616 and 3617). Latch A or B is set by the occurrence of the SC terminate pulse during one phase of the LSB of the channel counter. The uplink data call clear No. 2 signal remains true through a portion of the next phase of the LSB of the channel counter until uplink time slot bit time 7 occurs, whereupon the latch is reset. An Uplink Call Terminate pulse, in the meantime, clears the uplink data circuit memory 764 call bit stored in the time slot number gated out from control gating 3610 during the latter phase of the LSB.

The occurrence of the SC terminate pulse and the downlink decode enable No. 2 signal in the same channel time is used to detect the SC termination pattern on a call being placed.

The line termination memory circuit, shown in block diagram form in FIG. 37, temporarily stores a bit of information to indicate that a particular voice circuit line is to be freed by the interface unit after the terminal has detected the termination pattern for that call.

The line number storage memory 3710 is a 64 bit latch whose outputs are provided to the interface unit. One latch is dedicated to each voice circuit and is used to indicate that the corresponding voice circuit is to be cleared (latch set) or that it has been cleared (latch reset). The interface unit resets the latches when it has acknowledged the set bits and has cleared the voice circuits.

The digital demultiplexer 3720 is controlled by the voice circuit line number input via OR gating circuit 3730. In the case of active calls, the voice circuit line number and active call bit (Downlink Decode Enable 1) from downlink data circuit memory 763 control demultiplexer 3720 during the active call channel time. In the case of call placements 3720, the voice circuit line number from the user call request register 1110 and the Downlink Decode Enable 2 signal from call placement controller 751 control the demultiplexer during the downlink channel time assigned to the call.

The fine sync maintenance reset detector, shown in block diagram form in FIG. 38, is used to detect the non-occurrence of active time slots. The detector provides two signals: the No Time Slots Available signal and the Fine Sync Maintenance Inhibit signal. If the non-occurrence of active time slots is verified during a complete uplink frame time, the detector outputs the No Time Slots Available Signal and if the non-occurrence of active time slots is verified for a period equal to a two-way link delay, the detector outputs the Fine Sync Maintenance Inhibit signal.

The No Time Slots Available signal is used to indicate when the terminal is "inactive" and cannot transmit a wideband call request to the spacecraft.

The Fine Sync Maintenance Inhibit signal is used to place the terminal in a non-active status. This signal is used to reset the Fine Sync Maintenance Enable signal to the uplink sync correction logic. A call request received when this signal is true is treated as an initial call and the terminal's uplink frame is resynchronized.

The call detection logic 3810 contains a latch which is set by the uplink start of frame pulse and reset by either of the uplink encode signals: Uplink Encode Enable No. 1 and Uplink Encode Enable No. 2. The clock is enabled to the timer 3820 when the latch is set and disabled when the latch is reset. If the timer counter reaches the two-way link delay count, the clock input is inhibited and the output signals remain true until the terminal Initial Synchronization signal occurs again.

The user interface unit 690 provides the signaling and control required to electrically integrate the terminal with the system users as well as the required voice or other data switching. The user interface unit hence provides the following principal functions: provides the required signaling and control for both the user and the digital equipment of the data terminal; accepts the specified signaling and control from both the user and the digital equipment of the data terminal; and switches the voice or other data lines from the users to the digital equipment and to the users from the digital equipment. A user interface unit for integrating a terminal which a particular telephone exchange is necessarily dependent upon the design of the eschange in question. Using the specifications for a particulalr exchange and the design details for the data terminal digital equipment disclosed above, such an interface unit can readily be implemented with conventional telephone interface equipment.

What is claimed is:

1. In a data terminal adapted for use in a time division multiple access communication system, the combination comprising:

means for converting incoming user signals into respective digital words;

means for multiplexing each of said digital words into respective time slot data at respective pre-assigned time slot times;

means for transmitting said respective time slot data as a burst of data having a preamble comprising a data-free guard time interval, fixed digital data for permitting a processing repeater to acquire bit and word synchronization with said data burst, and variable digital call request data for use by said processing repeater, as an uplink burst transmission at a first given data rate during said pre-assigned time slot times;

means for receiving, demodulating and maintaining synchronization with an essentially continuous downlink transmission free from said guard time intervals at a second data rate slower than said given data rate;

means for identifying pre-assigned channels within said downlink transmission;

means for demultiplexing data in each of said pre-assigned channels into a respective digital word; and means for converting said digital word into an outgoing user signal.

2. The data terminal of claim 1 further comprising means for associating a particular uplink time slot time carrying user-generated signals from a first data terminal with a particular downlink channel carrying data derived from signals generated by a second user connected to a second data terminal whereby a two-way circuit may be established.

* * * * *